US006538065B1

(12) United States Patent
Suriano et al.

(10) Patent No.: US 6,538,065 B1
(45) Date of Patent: Mar. 25, 2003

(54) METHOD FOR PREPARING COPOLYESTERCARBONATES AND ARTICLES THEREFROM

(75) Inventors: Joseph Anthony Suriano, Clifton Park, NY (US); Tiberiu Mircea Siclovan, Rexford, NY (US); Gregory Allen O'Neil, Clifton Park, NY (US); Daniel Joseph Brunelle, Burnt Hills, NY (US); Jimmy Lynn Webb, Ballston Lake, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/916,160

(22) Filed: Jul. 26, 2001

(51) Int. Cl.[7] .................................................. C08F 8/30
(52) U.S. Cl. ................ 525/182; 428/423.7; 525/133; 525/191; 528/176; 528/196; 528/198
(58) Field of Search ................ 525/133, 182, 525/191; 428/423.7; 528/176, 196, 198

(56) References Cited

U.S. PATENT DOCUMENTS

| 3,030,331 A | 4/1962 | Goldberg |
| 3,169,121 A | 2/1965 | Goldberg |
| 3,207,814 A | 9/1965 | Goldberg |
| 3,299,172 A | 1/1967 | Schade et al. |
| 3,395,119 A | 7/1968 | Blaschke et al. |
| 3,399,170 A | 8/1968 | Blaschke et al. |
| 3,413,379 A | 11/1968 | Schade et al. |
| 3,460,961 A | 8/1969 | Young, Jr. et al. |
| 3,498,950 A | 3/1970 | Shatz et al. |
| 3,939,117 A | 2/1976 | Ueno |
| 4,108,834 A | 8/1978 | Buxbaum |
| 4,127,560 A | 11/1978 | Kramer |
| 4,137,278 A | 1/1979 | Lemper et al. |
| 4,156,069 A | 5/1979 | Prevorsek et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,255,555 A | 3/1981 | Salee et al. |
| 4,278,785 A | 7/1981 | Rosenfeld |
| 4,319,017 A | 3/1982 | Kosanovich et al. |
| 4,334,053 A | 6/1982 | Freitag et al. |
| 4,487,896 A | 12/1984 | Mark et al. |
| 4,506,065 A | 3/1985 | Miller et al. |
| 4,661,580 A | 4/1987 | Ranade |
| 4,680,371 A | 7/1987 | Rosenfeld et al. |
| 4,725,647 A | 2/1988 | Maresca et al. |
| 4,782,131 A | 11/1988 | Sweeny |
| 4,957,996 A | 9/1990 | Lamonte |
| 5,494,997 A * | 2/1996 | Fontana et al. .............. 528/176 |
| 5,714,567 A | 2/1998 | Idage et al. |
| 5,807,965 A | 9/1998 | Davis |
| 5,916,997 A | 6/1999 | Webb et al. |
| 6,306,507 B1 * | 10/2001 | Brunelle et al. ............. 428/323 |
| 6,307,005 B1 | 10/2001 | Davis et al. |

FOREIGN PATENT DOCUMENTS

| EP | 0 035 897 | 2/1985 |
| GB | 924607 | 4/1963 |
| GB | 2 085 458 | 4/1982 |
| JP | 58-38721 | 9/1981 |
| JP | 56-133332 | 10/1981 |
| JP | 61255957 | 11/1986 |
| JP | 201326 | 8/1989 |
| JP | 02169623 | 6/1990 |
| JP | 02169624 | 6/1990 |
| JP | 02169625 | 6/1990 |
| JP | 07102154 | 4/1995 |
| WO | WO 00/26274 | 5/2000 |
| WO | WO 00/61664 | 10/2000 |
| WO | WO 00/69945 | 11/2000 |

OTHER PUBLICATIONS

Application Ser. No. 09/416.529. (allowed) No. Patent ™ as of Jul. 10, 2002.
Journal of Polymer Science, "Interfacial Polycondensation. X. Polyphenyl Esters", William M. Eareckson, III, vol. XL, pp. 399–406, 1959.

* cited by examiner

Primary Examiner—Terressa M. Boykin
(74) Attorney, Agent, or Firm—S. Bruce Brown; Noreen C. Johnson

(57) ABSTRACT

Block copolyestercarbonates substantially free of anhydride linkages linking at least two mers of the polymer chain may be prepared by a method which comprises the steps of: (A) preparing a hydroxy-terminated polyester intermediate in a molten reaction mixture comprising at least one 1,3-dihydroxybenzene moiety and at least one aromatic dicarboxylic acid diarylester under transesterification conditions, said polyester intermediate having a degree of polymerization of at least 4; and (B) conducting a reaction of said polyester intermediate with a carbonate precursor in a two-phase system comprising an aqueous phase and a water-immiscible organic solvent. Articles comprising the copolyestercarbonates are another aspect of the invention.

80 Claims, No Drawings

METHOD FOR PREPARING COPOLYESTERCARBONATES AND ARTICLES THEREFROM

BACKGROUND OF THE INVENTION

This invention relates to a method for preparation of thermally stable copolyestercarbonates comprising polyester chain members derived from at least one 1,3-dihydroxybenzene and at least one aromatic dicarboxylic acid. The invention also relates to articles made from thermally stable copolyestercarbonates.

Various resinous articles comprising polymers have a problem of long term color instability. In many cases this instability is seen as yellowing of the polymer, detracting from the article's attractiveness and also transparency when the polymer was initially transparent. Loss of gloss can also be an undesirable long term phenomenon in a resinous article.

Yellowing of polymers is often caused by the action of ultraviolet radiation, and such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds, which must be employed at relatively low levels, typically up to 1% by weight, to avoid degradation of the physical properties of the polymer such as impact strength and high temperature properties as reflected in heat distortion temperature.

One way of protecting a resinous article against photoyellowing and loss of gloss is to apply a coating of a weatherable second polymer, the term "weatherable" as used herein signifying resistance to such phenomena. Coatings made from polyesters containing chain members derived from at least one 1,3-dihydroxybenzene derivative and at least one aromatic dicarboxylic acid (sometimes referred to hereinafter as resorcinol arylate polyesters) often possess good weatherability properties. The arylate moieties typically comprise isophthalate, terephthalate, or especially mixtures of iso- and terephthalate units. Resorcinol arylate polyesters comprising mixtures of isophthalate and terephthalate chain members typically have good weatherability properties and may provide protection against photoyellowing when coated over a resinous substrate.

The good weatherability properties of polyesters comprising resorcinol arylate units is believed to arise in large part from the screening effect said polymers may provide to ultraviolet (UV) light. On exposure to UV light polymers comprising resorcinol arylate chain members may undergo photochemical Fries rearrangement converting at least a portion of the polymer from polyester chain members to o-hydroxybenzophenone-type chain members. The o-hydroxybenzophenone-type chain members act to screen further UV light and protect UV-sensitive components in a resorcinol arylate-containing composition. The good weatherability properties of polymers comprising resorcinol arylate chain members make them especially useful in blends and also in multilayer articles in which said polymers may act as a protecting layer for more sensitive substrate components.

Polyesters containing resorcinol arylate chain members have been prepared by an interfacial method. The interfacial method comprises a solvent mixture containing water and at least one organic solvent substantially immiscible with water. According to U.S. Pat. No. 3,460,961 and Eareckson, Journal of Polymer Science, vol. XL, pp. 399–406 (1959), preparation of resorcinol arylate polyesters with a mixture of iso- and terephthalate chain members is performed by an interfacial method in water and a water-immiscible solvent such as chloroform or methylene chloride using 1:1 stoichiometric ratio of resorcinol to either iso- or terephthaloyl dichloride, or a mixture thereof, in the presence of aqueous sodium hydroxide. The resorcinol is combined with the aqueous sodium hydroxide before addition of acid chlorides, and the reaction is run at pH which is initially high but which decreases as the reaction proceeds. The molecular weight of the polymers is not controlled. The method provides polymer with very high weight average molecular weight (Mw) and low hydroxy end-group concentration, making the polymer unsuitable for some applications. Furthermore, the polymer has poor thermal stability and loses molecular weight upon thermal treatment.

Block copolyestercarbonates comprising resorcinol arylate chain members in combination with carbonate chain members are disclosed in commonly owned, co-pending application Ser. No. 09/416,529, filed Oct. 12, 1999. These copolymers have excellent weatherability and are compatible with polycarbonates in blends. In one embodiment these block copolyestercarbonates are prepared by a method which comprises the steps of: (A) preparing a hydroxy-terminated polyester intermediate having a degree of polymerization of at least 4 by the reaction of at least one 1,3-dihydroxybenzene moiety with at least one aromatic dicarboxylic acid dichloride under alkaline conditions; and (B) conducting a reaction of said polyester intermediate with a carbonate precursor. The polyester intermediate is synthesized by an interfacial method employing in one embodiment resorcinol, isophthaloyl dichloride, terephthaloyl dichloride, water and methylene chloride, which is often the organic solvent of choice.

The polyester intermediate comprises hydroxy end-groups suitable for growing polycarbonate chains in a subsequent reaction step with a carbonate precursor, and optional second dihydroxy compound. However, formation of hydroxy terminated, low molecular weight resorcinol arylate polyester oligomers (for example, with degree of polymerization of about 5–20) is quite difficult when typical procedures are followed. This is believed to be due to high water solubility and very low methylene chloride solubility of resorcinol as compared to other dihydric phenol monomers. Conventional methods of producing resorcinol arylate polyester oligomers lead to very high molecular weight polyesters, even when a large excess of resorcinol is employed. In addition such polyesters typically exhibit thermal instability, which is believed to be due to the presence of anhydride linkages in the polyester chains. Control of oligomer molecular weight and polymer terminal groups in resorcinol arylate polyester oligomers can be achieved to some extent by the use of phase transfer catalysts, as disclosed in commonly owned, copending application Ser. No. 09/368,706, filed Aug. 5, 1999. Unfortunately, several issues with the use of phase transfer catalysts in large scale operations exist. Emulsions can be encountered during work-up and washing steps using centrifugal separators, and the presence of phase transfer catalysts can accelerate polymer hydrolysis during work-up or cause problems with recycle brine streams. Thus, it would be desirable to obtain hydroxy-terminated, thermally stable, low molecular weight polyester oligomers comprising 1,3-dihydroxybenzene moieties via an alternative process.

A method previously disclosed for the formation of high molecular weight (as opposed to low molecular weight)

polyesters comprising arylate structural units is a melt process wherein the polymerization reaction is a transesterification or redistribution reaction of diphenylphthalates and a dihydric phenol, such as is described in GB 924,607. In order to shift the reaction equilibrium to the product polyester and thus increase molecular weight, the phenol by-product is continuously removed from the reaction mixture, typically under reduced pressure. The molecular weight build in the melt process typically takes place in two or more steps in a cascade of reactors with subsequently higher temperatures and higher vacuum to remove the phenol from an increasingly more viscous polymer.

Japanese Kokai 56/133,332 describes copolyestercarbonates "having a highly alternating orientation" rather than a block structure. They are prepared by a 2-step process in which the first step is preparation of a hydroxy-terminated polyester oligomer having a degree of polymerization of only 1–2 and made by an interfacial process in the presence of methylene chloride. The second step is treatment of said oligomer in an interfacial process with a carbonate precursor such as phosgene to afford a final product having essentially alternating polyester and polycarbonate linkages; i.e., the degree of polymerization of the carbonate blocks is also about 1–2. These copolyestercarbonates are alleged to have excellent heat resistance, solvent resistance and moldability. No details of their weatherability are provided.

It remains of interest, therefore, to develop a method for preparing thermally stable block copolyestercarbonates comprising resorcinol arylate chain members through preparation in a first step of low molecular weight hydroxy-terminated polyester oligomers comprising 1,3-dihydroxybenzene moieties. The polyester oligomers desirably have controlled molecular weight, high thermal stability, and low color. There is also a particular need for weatherable, solvent resistant articles comprising block copolyestercarbonates, which are capable of use for degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions as the melt viscosity changes.

In one embodiment block copolyestercarbonates of the present invention comprise alternating polycarbonate and polyester blocks. Within the context of the invention "alternating polycarbonate and polyester blocks" means that the copolyestercarbonates comprise at least one polycarbonate block and at least one polyester block.

In a particular embodiment block copolyestercarbonates comprise structural units of the formula (I):

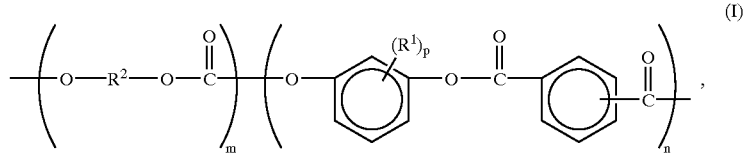

wherein each $R^1$ is independently halogen or $C_{1-12}$ alkyl, p is 0–3, each $R^2$ is independently a divalent organic radical, m is at least 1 and n is at least about 4. In one embodiment n is at least about 10, in another embodiment n is at least about 20, in another embodiment n is at least about 30, in another embodiment n is in a range of between about 4 and about 150, in another embodiment n is in a range of between about 10 and about 150, in another embodiment n is in a range of between about 20 and about 150, and in still another embodiment n is in a range of between about 30 and about 150. In one embodiment m is at least about 3, in another embodiment m is at least about 10; in another embodiment m is at least about 20; in another embodiment m is in a range of between about 1 and about 200; in another embodiment m is in a range of between about 3 and about 200; in another embodiment m is in a range of between about 10 and about 200; and in still another such varied purposes as body parts for outdoor vehicles and devices (OVAD) such as automobiles.

SUMMARY OF THE INVENTION

The present inventors have discovered a method to prepare block copolyestercarbonates comprising resorcinol arylate polyester chain members which provides polymer in thermally stable form with controlled molecular weight without the need to employ an interfacial method for polyester oligomer preparation.

In one of its embodiments the present invention provides a method for preparing a block copolyestercarbonate substantially free of anhydride linkages linking at least two mers of the polymer chain, which comprises the steps of:

(A) preparing a hydroxy-terminated polyester intermediate in a molten reaction mixture comprising at least one 1,3-dihydroxybenzene moiety and at least one aromatic dicarboxylic acid diarylester under transesterification conditions, said polyester intermediate having a degree of polymerization of at least 4; and (B) conducting a reaction of said polyester intermediate with a carbonate precursor in a two-phase system comprising an aqueous phase and a water-immiscible organic solvent.

Various other features, aspects, and advantages of the present invention will become more apparent with reference to the following description and appended claims.

DETAILED DESCRIPTION

In one embodiment the present invention comprises a two step, melt-interfacial method for preparing thermally stable block copolyestercarbonates comprising resorcinol arylate polyester chain members which derive their thermal stability in large part from being substantially free of anhydride linkages in the polymer chains. Thermal stability within the context of the present invention refers to resistance of a polymer to molecular weight degradation under thermal conditions. Thus, a polymer with poor thermal stability shows significant molecular weight embodiment m is in a range of between about 20 and about 200. In some embodiments m is between about 20 and about 50.

The ester blocks comprise structural units derived from 1,3-dihydroxybenzene moieties which may be unsubstituted or substituted. Alkyl substituents, if present, are exemplified by straight-chain, branched, or cyclic alkyl groups, and are most often located in the ortho position to both oxygen atoms although other ring locations are contemplated. Suitable $C_{1-12}$ alkyl groups comprise methyl, ethyl, n-propyl, isopropyl, butyl, iso-butyl, t-butyl, hexyl, cyclohexyl, nonyl, decyl, and aryl-substituted alkyl, such as benzyl. In one embodiment a suitable $C_{1-12}$ alkyl group is methyl. Suitable halogen substituents comprise bromo, chloro, and fluoro. 1,3-Dihydroxybenzene moieties containing a mixture of alkyl and halogen substituents are also suitable. The value for p may be 0–3; in one embodiment the value for p is 0–2, and in another embodiment the value for p is 0–1. One example of a suitable 1,3-dihydroxybenzene moiety is 2-methylresorcinol. In some embodiments the 1,3-dihydroxybenzene moiety is unsubstituted resorcinol in which p is zero. Polymers containing mixtures of 1,3-dihydroxybenzene moieties, such as a mixture of unsubstituted resorcinol with 2-methylresorcinol are also contemplated.

The ester blocks also comprise structural units derived from dicarboxylic acid moieties which are bound to structural units derived from 1,3-dihydroxybenzene moieties. Structural units derived from dicarboxylic acid moieties may comprise monocyclic aromatic moieties. In some embodiments monocyclic aromatic moieties comprise phenyl and further comprise isophthalate or terephthalate, or their alkyl, halogen or chlorine-substituted derivatives wherein said optional substituents are as defined for 1,3-dihydroxybenzene moieties. Structural units derived from dicarboxylic acid moieties may also comprise polycyclic aromatic moieties. In some embodiments polycyclic aromatic moieties comprise fused polycyclic aromatic moieties such as naphthyl, linked polycyclic aromatic moieties such as biaryls or biphenyl, or moieties of the formula —Ar—$Y^1$—Ar—, wherein Ar is an aromatic moiety and $Y^1$ is $C_{1-10}$ alkylene, haloalkylene, —O—, —S—, —SO—, —$SO_2$—, —CO—, —$(R^3)P(=O)$—, or —$(R^3)N$—, wherein $R^3$ comprises alkyl, haloalkyl, aryl, haloaryl, alkaryl, haloalkaryl, aralkyl, haloaralkyl, cycloalkyl, or halocycloalkyl. In some particular embodiments polycyclic aromatic moieties comprise biphenyl-4,4'-dicarboxylate, diphenylether-4,4'-dicarboxylate, diphenylsulfone-4,4'-dicarboxylate, diphenylketone-4,4'-dicarboxylate, diphenylsulfide-4,4'-dicarboxylate, diphenylmethane-4,4'-dicarboxylate, diphenyldichloromethane-4,4'-dicarboxylate, or naphthalenedicarboxylate, such as naphthalene-2,6-dicarboxylate and naphthalene-2,7-dicarboxylate; or alkyl-, halogen- or chlorine-substituted derivatives of said polycyclic moieties, wherein said optional substituents are as defined for 1,3-dihydroxybenzene moieties. In some embodiments dicarboxylic acid moieties comprise mixtures of any of the foregoing monocyclic and/or polycyclic aromatic dicarboxylates. In one embodiment the aromatic dicarboxylic acid moieties comprise isophthalate and/or terephthalate. Either or both of said latter moieties may be present. For the most part, both are present in a molar ratio of isophthalate to terephthalate in the range of about 0.2–5.0:1. In some embodiments when the isophthalate to terephthalate ratio is greater than about 4.0:1, then unacceptable levels of cyclic oligomer may form. In other embodiments when the isophthalate to terephthalate ratio is less than about 0.25:1, then unacceptable levels of insoluble polymer may form. In one embodiment the molar ratio of isophthalate to terephthalate is about 0.4–2.5:1, and in another embodiment about 0.67–1.5:1.

In another embodiment ester blocks of block copolyestercarbonates comprise structural units derived from 1,3-dihydroxybenzene moieties in combination with structural units derived from alkylene dicarboxylic acid, alkylene diol, or alkylene alpha-hydroxy-omega-carboxylic acid moieties. In some embodiments these alkylene structural units are termed "soft-block" segments. The term soft-block as used herein, indicates that at least some segments of the ester blocks are made from non-aromatic monomer units. Such non-aromatic monomer units are known in certain embodiments to impart flexibility to the soft-block-containing polymers. In some embodiments the ester blocks comprise those comprising structural units of formulas (II), (III), and (IV):

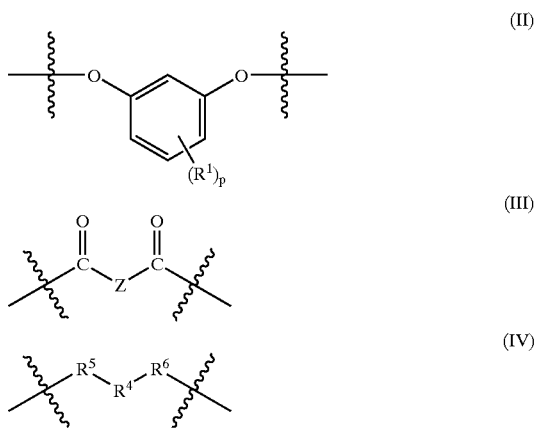

wherein $R^1$ and p are as previously defined; Z is an aromatic radical; $R^4$ is an aliphatic group; and $R^5$ and $R^6$ each independently represent

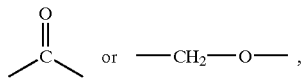

wherein formula (IV) in one embodiment contributes from about 1 to about 45 mole percent to the ester linkages of the polyester block. In another embodiment formula (IV) contributes from about 5 to about 40 mole percent, and in still another embodiment about 5 to about 20 mole percent to the ester linkages of the polyester block. Another embodiment provides a composition wherein $R^4$ comprises a $C_{3-20}$ straight chain alkylene, $C_{3-20}$ branched alkylene, or $C_{4-20}$ cyclo- or bicycloalkylene group. Another embodiment provides a composition wherein $R^4$ comprises a $C_{3-14}$ straight chain alkylene, or $C_{5-6}$ cycloalkylene, and still another embodiment provides a composition wherein $R^4$ represents $C_{3-10}$ straight-chain alkylene or $C_6$-cycloalkylene. Formula (III) represents an aromatic dicarboxylic acid residue. The divalent aromatic radical Z in formula (III) may be derived from at least one divalent monocyclic or polycyclic dicarboxylic acid moiety as defined hereinabove; in some embodiments the divalent aromatic radical Z in formula (III) may be comprise at least one of 1,3-phenylene, 1,4-phenylene, or 2,6-naphthylene. In some embodiments Z comprises at least about 40 mole percent 1,3-phenylene. In some embodiments of copolyesters containing soft-block chain members p in formula (II) is zero.

In some embodiments of the invention ester blocks of block copolyestercarbonates comprise from about 1 to about 45 mole % sebacate or cyclohexane-1,4-dicarboxylate units. In a particular embodiment ester blocks comprise resorcinol isophthalate and resorcinol sebacate units in molar ratio between 8.5:1.5 and 9.5:0.5.

In the polycarbonate blocks, each R2 is independently an organic radical derived from a dihydroxy compound. In some embodiments at least about 60 percent of the total number of R2 groups in the polymer are aromatic organic radicals and the balance thereof are aliphatic, alicyclic, or aromatic radicals. Suitable R2 radicals comprise m-phenylene, p-phenylene, 4,4'-biphenylene, 4,4'-bi(3,5-dimethyl)-phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

In various embodiments of the invention suitable dihydroxy-substituted aromatic hydrocarbons also comprise 4,4'-(3,3,5-trimethylcyclohexylidene)diphenol; 1,1-bis(4-hydroxy-3-methylphenyl)cyclohexane; 2,2-bis(4-hydroxyphenyl)propane (commonly known as bisphenol-A); 2,2-bis(4-hydroxy-3,5-dimethylphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; hydroquinone, resorcinol; C1–3 alkyl-substituted resorcinols.

Suitable dihydroxy-substituted aromatic hydrocarbons also comprise those containing indane structural units such as represented by the formula (V), which compound is 3-(4-hydroxyphenyl)-1,1,3-trimethylindan-5-ol, and by the formula (VI), which compound is 1-(4-hydroxyphenyl)-1,3,3-trimethylindan-5-ol:

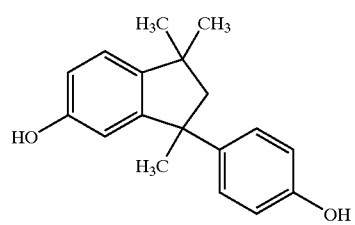

(V)

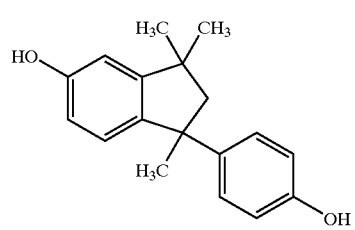

(VI)

Also included among suitable dihydroxy-substituted aromatic hydrocarbons are the 2,2,2',2'-tetrahydro-1,1'-spirobi[1H-indene]diols having formula (VII):

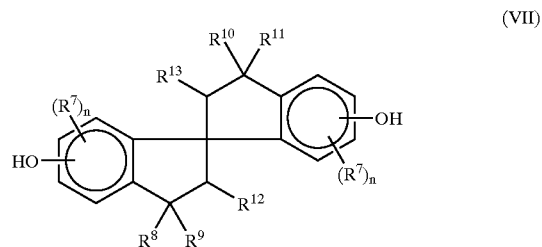

(VII)

wherein each $R^7$ is independently selected from monovalent hydrocarbon radicals and halogen radicals; each $R^8$, $R^9$, $R^{10}$, and $R^{11}$ is independently $C_{1-6}$ alkyl; each $R^{12}$ and $R^{13}$ is independently H or $C_{1-6}$ alkyl; and each n is independently selected from positive integers having a value of from 0 to 3 inclusive. In one embodiment a 2,2,2',2'-tetrahydro-1,1'-spirobi[1H-indene]-diol is 2,2,2',2'-tetrahydro-3,3,3',3'-tetramethyl-1,1'-spirobi[1H-indene]-6,6'-diol.

In some embodiments each $R^2$ is an aromatic organic radical and in other embodiments a radical of the formula (VIII):

$$—A^1—Y^2—A^2—,$$ (VIII)

wherein each $A^1$ and $A^2$ is a monocyclic divalent aryl radical and $Y^2$ is a bridging radical in which one or two carbon atoms separate $A^1$ and $A^2$. The free valence bonds in formula (VIII) are usually in the meta or para positions of $A^1$ and $A^2$ in relation to $Y^2$. Compounds in which $R^2$ has formula (VIII) are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula (VIII), $A^1$ and $A^2$ typically represent unsubstituted phenylene or substituted derivatives thereof, illustrative substituents (one or more) being alkyl, alkenyl, and halogen (particularly bromine). In one embodiment $A^1$ and $A^2$ are unsubstituted phenylene radicals. In another embodiment both $A^1$ and $A^2$ are p-phenylene, although both may be o- or m-phenylene or one o- or m-phenylene and the other p-phenylene.

The bridging radical, $Y^2$, is one in which one or two atoms, separate $A^1$ from $A^2$. In one embodiment one atom separates $A^1$ from $A^2$. Illustrative, non-limiting radicals of this type are —C=O, —O—, —S—, —SO— or —SO$_2$—, methylene, cyclohexylmethylene, 2-[2.2.1]-bicycloheptyl methylene, ethylene, isopropylidene, neopentylidene, cyclohexylidene, cyclopentadecylidene, cyclododecylidene, and adamantylidene.

In one embodiment $Y^2$ is a gem-alkylene radicals. Also included, however, are unsaturated radicals. In a particular embodiment the bisphenol is 2,2-bis(4-hydroxy-phenyl)propane (hereinafter referred to as bisphenol A or BPA), in which $Y^2$ is isopropylidene and $A^1$ and $A^2$ are each p-phenylene.

Depending upon whether or not any unreacted 1,3-dihydroxybenzene moiety is present in the reaction mixture as described hereinafter, $R^2$ in the polycarbonate blocks may consist of or at least partially comprise a radical derived from a 1,3-dihydroxybenzene moiety. Therefore, in one embodiment of the present invention the copolyestercarbonates comprise polycarbonate blocks with $R^2$ radicals derived from a dihydroxy compound identical to at least one 1,3-dihydroxybenzene moiety in the polyester blocks. In another embodiment the copolyestercarbonates comprise polycarbonate blocks with $R^2$ radicals derived from a dihydroxy compound different from any 1,3-dihydroxybenzene moiety in the polyester blocks. In yet another embodiment the copolyestercarbonates comprise polycarbonate blocks containing a mixture of $R^2$ radicals derived from dihydroxy compounds at least one of which is the same as and at least one of which is different from any 1,3-dihydroxybenzene moiety in the polyester blocks. When a mixture of $R^2$ radicals derived from dihydroxy compounds is present, then the molar ratio of dihydroxy compounds identical to those present in the polyester blocks to those dihydroxy compounds different from those present in the polyester blocks is typically about 1:999 to 999:1. In some embodiments the copolyestercarbonates comprise polycarbonate blocks containing a mixture of $R^2$ radicals derived from at least two of unsubstituted resorcinol, a substituted resorcinol, and bisphenol A.

Diblock, triblock, and multiblock copolyestercarbonates are encompassed in the present invention. The chemical linkages between blocks comprising polyester chain members and blocks comprising polycarbonate chain members typically comprise a carbonate linkage between a diphenol residue of a polyester moiety and a —(C=O)—O— moiety of a polycarbonate moiety, although other types of linkages such as ester and/or anhydride are also possible. A typical carbonate linkage between said blocks is shown in formula (IX), wherein $R^1$ and p are as previously defined:

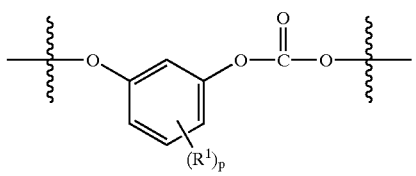

(IX)

In one embodiment the copolyestercarbonate is substantially comprised of a diblock copolymer with a carbonate linkage between a polyester block and a polycarbonate block. In another embodiment the copolyestercarbonate is substantially comprised of a triblock carbonate-ester-carbonate copolymer with carbonate linkages between the polyester block and polycarbonate end-blocks. Copolyestercarbonates with at least one carbonate linkage between a polyester block and a polycarbonate block are typically prepared from polyester oligomers comprising at least one 1,3-dihydroxybenzene and whose chains contain in one embodiment at least one and in other embodiments at least two hydroxy-terminal sites (hereinafter sometimes referred to as hydroxy-terminated polyester intermediate).

In another embodiment the copolyestercarbonate comprises polyester blocks linked by carbonate linkages as shown in the representative structure of formula (X):

comprises a hydroxyphenol residue derived from a 1,3-dihydroxybenzene moiety or an aryloxycarboxyphenyl residue derived from an aromatic dicarboxylic acid diarylester. Copolyestercarbonates comprising formula (X) may arise from reaction of hydroxy-terminated polyester intermediate with a carbonate precursor in the substantial absence of any dihydroxy compound different from the hydroxy-terminated polyester intermediate.

In the copolyestercarbonates of the present invention the distribution of the blocks may be such as to provide a copolymer having any desired weight proportion of polyester blocks in relation to polycarbonate blocks. In one embodiment the copolymers contain about 10–99% by weight polyester blocks.

In step (A) of the method of the invention for the preparation of block copolyestercarbonates, an oligomeric polyester intermediate is prepared by a transesterification reaction in the melt by combining at least one 1,3-dihydroxybenzene moiety with at least one diester of a dicarboxylic acid. In one embodiment the molar ratio of 1,3-dihydroxybenzene moiety to dicarboxylic acid diester is greater than 1:1; in another embodiment in the range of between about 1.01:1 and about 1.90:1, in another embodiment in the range of between about 1.01:1 and about 1.25:1, and in still another embodiment in a range of between about 1.1:1 and about 1.2:1.

In various embodiments 1,3-dihydroxybenzene moieties may comprise those defined hereinabove. In particular embodiments illustrative examples of 1,3-dihydroxybenzene moieties may comprise unsubstituted resorcinol or an alkyl- and/or halo-substituted resorcinol or mixtures of the foregoing.

In various embodiments dicarboxylic acid diesters may comprise precursors for structural units derived from dicarboxylic acid moieties as defined hereinabove. In one embodiment dicarboxylic acid diesters are diaryl esters derived from a dicarboxylic acid and a monohydroxy aromatic compound, wherein aromatic moieties are monocyclic or polycyclic aromatic moieties as defined herein. In particular embodiments illustrative examples of dicarboxylic acid diaryl esters may comprise monocyclic aromatic dicarboxylic acid diaryl esters such as diaryl isophthalate, diaryl terephthalate, or their halogen or chlorine-substituted derivatives; or polycyclic aromatic dicarboxylic acid diaryl esters such as fused polycyclic aromatic dicarboxylic acid diaryl esters including naphthalene diaryl ester; linked polycyclic aromatic moieties including biaryl diaryl esters or biphenyl diaryl ester, or moieties of the formula Ar'O—Ar—$Y^1$—Ar—OAr', wherein Ar and Ar' are independently aromatic moieties as defined herein and $Y^1$ is $C_{1-10}$ alkylene, haloalkylene, —O—, —S—, —SO—, —SO$_2$—, —CO—, —(R$^3$)P(=O)—, or —(R$^3$)N—, wherein $R^3$ comprises alkyl, haloalkyl, aryl, haloaryl, alkaryl, haloalkaryl, aralkyl,

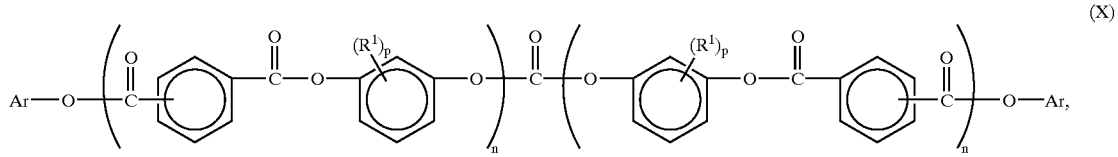

(X)

wherein $R^1$, p, and n are as previously defined, Ar is an aromatic moiety, and the polyester structural units are as described for formula I. In some embodiments Ar haloaralkyl, cycloalkyl, or halocycloalkyl. In some particular embodiments polycyclic aromatic dicarboxylic acid diaryl esters comprise biphenyl-4,4'-diaryldicarboxylate, diphenylether-4,4'-diaryldicarboxylate, diphenylsulfone-4, 4'-diaryldicarboxylate, diphenylketone-4,4'-diaryldicarboxylate, diphenylsulfide-4,4'-diaryldicarboxylate, diphenylmethane-4,4'-diaryldicarboxylate, diphenyldichloromethane-4,4'-diaryldicarboxylate, or naphthalene diaryldicarboxylate, such as naphthalene-2,6-diaryldicarboxylate and naphthalene-2,7-diaryldicarboxylate; or halogen or chlorine-substituted derivatives of said polycyclic aromatic dicarboxylic acid diaryl esters. In other embodiments dicarboxylic acid diesters comprise alkylene dicarboxylic acid diesters, and in a particular embodiment alkylene dicarboxylic acid diaryl esters, wherein alkylene groups comprise in various embodiments $C_{3-20}$ straight chain alkylene, $C_{3-20}$ branched alkylene, or $C_{4-20}$ cyclo- or bicycloalkylene group In some embodiments dicarboxylic acid diesters comprise mixtures of any combination of the foregoing alkylene, monocyclic and polycyclic aromatic dicarboxylic acid diaryl esters in amounts to provide proportions of structural units as described hereinabove. In various embodiments diaryl esters comprise diphenyl esters and are derived from phenol. In some embodiments aromatic dicarboxylic acid diaryl esters comprise diphenyl isophthalate, diphenyl terephthalate, or mixtures thereof. Either or both of isophthalate and terephthalate moieties may be present. In other embodiments diaryl esters comprise those derived from monohydroxy aromatic compounds comprising at least one electron withdrawing group ortho, meta, or para to the oxygen substituent of the monohydroxy moiety. In another embodiment diaryl esters comprise those derived from monohydroxy aromatic compounds comprising at least one electron withdrawing group ortho or para to the oxygen substituent of the monohydroxy moiety. In another embodiment diaryl esters comprise those derived from monohydroxy aromatic compounds comprising at least one electron withdrawing group ortho or para to the oxygen substituent of the monohydroxy moiety selected from the group consisting of carboalkoxy, carboaryloxy, carboaryl, halo, cyano, and nitro, and mixtures thereof. In another embodiment diaryl esters comprise those derived from monohydroxy aromatic compounds selected from the group consisting of o-carbomethoxyphenol, o-carbomethoxymethylphenol, o-carboethoxyphenol, o-carbopropoxyphenol, o-chlorophenol, o-carbophenylphenol, o-carbophenoxyphenol, o-carbobenzoxyphenol, and o-nitrophenol.

Step (A) of the method may be conducted in the presence of at least one catalyst. Suitable catalysts comprise those known to effect transesterification reactions. In various embodiments catalysts comprise acidic, neutral, or basic catalysts, such classifications often being based on the reaction of a conventional acid-base indicator and the catalyst when the latter is dissolved in a polar ionizing solvent such as water. In one embodiment a basic catalyst is employed. Suitable basic catalysts comprise the alkali metals, examples of which comprise lithium, sodium, potassium, rubidium, and cesium; and their corresponding carbonates, hydroxides, hydrides, borohydrides, phenates, bisphenates, (that is, salt of a bisphenol); carboxylates such as acetate or benzoate; fluorides; and oxides. Group II and III elements can also be used in place of the alkali metals of the foregoing classes of compounds such as metals and compounds of calcium, magnesium and aluminum. Other bases comprise trialkyl or triaryl tin hydroxides, acetates, phenates, and the like. In particular embodiments examples of catalysts comprise lithium, sodium, potassium, rubidium, and cesium metals; lithium hydride, aluminum triisopropoxide and triphenyl tin hydroxide.

In other embodiments catalysts comprise metal oxides, metal acetates, titanium, and tin compounds. Suitable metal oxides comprise antimony trioxide, germanium oxide, arsenic trioxide, lead oxide, magnesium oxide, and zinc oxide. Suitable metal acetates comprise cobalt acetate, zinc acetate, cadmium acetate and manganese acetate. Suitable titanium compounds comprise the titanates such as tetrabutyl titanate and tetraisopropyl titanate. Suitable tin compounds comprise dibutyl tin oxide, dibutyl tin methoxide and dibutyl tin dilaurate.

In other particular embodiments illustrative examples of catalysts comprise at least one nitrogen-containing basic compound, phosphorus-containing basic compound, alkali metal compound, alkaline earth metal compound, or a boric acid or boric ester. Mixtures of such catalysts may also be employed.

In various embodiments nitrogen-containing basic compounds comprise alkyl-, aryl- or alkaryl quaternary ammonium hydroxides such as tetramethylammonium hydroxide, tetraethylammonium hydroxide, tetrabutylammonium hydroxide and trimethylbenzylammonium hydroxide; tertiary amines represented by $R_3N$ (wherein R is alkyl or aryl or a mixture thereof) such as trimethylamine, triethylamine, dimethylbenzylamine and triphenylamine; secondary amines represented by $R_2NH$ (wherein R is as defined above); primary amines represented by $RNH_2$ (wherein R is as defined above); ammonia; or basic salts such as tetramethylammonium borohydride, tetrabutylammonium borohydride, tetrabutylammonium tetraphenyl borate, tetramethylammonium tetraphenyl borate, and hexaalkylguanidinium salts and alpha,omega-bis(pentaalkylguanidinium)alkane salts, comprising hexaethylguanidinium halides, alpha, omega-bis(pentaalkylguanidinium)alkane halides, and hexaethylguanidinium chloride. In various embodiments phosphorus-containing basic compounds comprise quaternary phosphonium hydroxides and quaternary phosphonium carboxylates, such as tetrabutylphosphonium acetate.

In various embodiments alkali metal compounds comprise sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, potassium borohydride, lithium borohydride, sodium borophenylate, sodium benzoate, potassium benzoate, lithium benzoate, disodium hydrogenphosphate, dipotassium hydrogenphosphate, dilithium hydrogenphosphate, disodium salt of bisphenol A, dipotassium salt of bisphenol A, dilithium salt of bisphenol A, sodium phenylate, potassium phenylate, and lithium phenylate.

In various embodiments alkaline earth metal compounds comprise calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

In various embodiments boric acid or boric acid ester compounds comprise boric acid and boric acid esters represented by the general formula $B(OR)_n(OH)_{3-n}$ (wherein R is alkyl or aryl, and n is 1, 2 or 3), and boric acid esters comprising trimethyl borate, triethyl borate, tributyl borate, trihexyl borate, triheptyl borate, triphenyl borate, tritolyl borate and trinaphthyl borate.

Catalyst may be present in one embodiment at a total level of about $10^{-8}$ moles to about 0.1 moles, in another embodiment at a total level of about $10^{-8}$ moles to about 0.06 moles, in another embodiment at a total level of about $10^{-8}$ moles to about 0.02 moles, in another embodiment at a total level of about $10^{-7}$ moles to about 0.02 moles, in another embodiment at a total level of about $10^{-6}$ moles to about 0.02 moles, in another embodiment at a total level of about $10^{-5}$ moles to about 0.02 moles, in another embodiment at a total level of about $10^{-4}$ moles to about 0.02 moles, and in still another embodiment at a total level of about $10^{-3}$ moles to about 0.02 moles, in all cases per mole of dicarboxylic acid diester compound.

In various embodiments the amount of the nitrogen containing basic compound employed is in one embodiment from about $10^{-6}$ moles to about $10^{-1}$ moles and in another embodiment from about $10^{-5}$ moles to about $10^{-2}$ moles, in all cases per mole of dicarboxylic acid diester compound. The amount of the alkali metal or alkaline earth metal compound employed is in one embodiment from about $10^{-8}$ moles to about $10^{-3}$ moles, in another embodiment from about $10^{-7}$ moles to about $10^{-4}$ moles, and in still another embodiment from about $10^{-7}$ moles to about $10^{-5}$ moles, in all cases per mole of dicarboxylic acid diester compound. The amount of the boric acid or boric acid ester is in one embodiment from about $10^{-8}$ moles to about $10^{-1}$ moles, in another embodiment from about $10^{-7}$ moles to about $10^{-2}$ moles, and in still another embodiment from about $10^{-6}$ moles to about $10^{-4}$ moles, in all cases per mole of dicarboxylic acid diester compound.

Prior to its introduction into a reaction mixture, a catalyst may be in liquid form, for example in the case of solid catalysts through melting or through dissolution in a liquid or normally solid, low melting solvent. In various embodiments solvents comprise phenol and substituted phenols. Substituted phenols which can be used comprise those comprising at least one substituent R, wherein R comprises alkyl of 1 to 10 carbon atoms, alkoxy of 1 to 10 carbon atoms, aryl of 6 to 10 carbon atoms, chloro, bromo or mixtures thereof. Illustrative examples of solvents comprise o-benzyl-phenol, o-bromophenol, m-bromophenol, m-chlorophenol, p-chlorophenol, 2,4-dibromophenol, 2,6-dichlorophenol, 3,5-dimethoxyphenol, o-ethoxyphenol, m-ethyl-phenol, p-ethylphenol, o-isopropylphenol, m-methoxyphenol, m-propylphenol, p- propylphenol, and the like. In other embodiments solvents may be of the ether type, for example, tetrahydrofuran and the various glymes, for example, ethylene glycol dimethylether and the like. Liquid phosphites such as triphenyl phosphite and tris (nonylphenyl)phosphite, and phosphates such as trimethyl or triethyl phosphate are also useful in diluents. In one embodiment any solvent or diluent used with a catalyst corresponds to a monohydroxy aromatic compound comprising a dicarboxylic acid diester as defined hereinabove. In a particular embodiment any solvent or diluent used with a catalyst corresponds to the monohydroxy aromatic compound comprising the dicarboxylic acid diester reactant. In another particular embodiment phenol comprises the solvent for the normally solid catalysts. Combinations of catalysts and combinations of solvents may also be used. In various embodiments when a basic catalyst is employed, the catalyst may be introduced concurrently with the aforementioned molten reactants to the polymerization to avoid heating the reactants in the presence of the catalyst prior to onset of the transesterification.

Methods for synthesizing polyesters by a transesterification reaction in the melt, typically in the presence of at least one catalyst, are well known in the art, and are described in many references, illustrative examples of which include U.S. Pat. Nos. 3,395,119; 3,399,170; 4,108,834; 4,137,278; 4,255,555; 4,278,785; 4,283,523; 4,319,017; 4,661,580; 4,680,371; 4,725,647; 4,782,131; and 4,957,996; European Patent Application No. 0035897; British Patent Nos. GB 924,607 and GB 2,085,458; and Japanese Patent Application Nos. 02169623; 02169624; 02169625; and 58038721.

Any transesterification reaction in the melt to prepare polyester oligomers may be performed in one or more stages. Transesterification reactions may be performed in batch, continuous, or semi-continuous mode. Temperatures for transesterification reactions are those sufficient to effect reaction and are in one embodiment above about 80° C., in another embodiment in a range between about 100° C. and about 400° C., in another embodiment in a range between about 150° C. and about 320° C., and in still another embodiment in a range between about 180° C. and about 260° C. In some embodiments transesterification reactions may be performed under reduced pressure to aid removal of monohydroxy aromatic compound derived from dicarboxylic acid diester. In various embodiments pressure may be reduced in steps. In various embodiments provision is made for recovery and recycle of monohydroxy aromatic compound using art-recognized methods. Depending upon various factors such as the boiling point of any 1,3-dihydroxybenzene moiety included as reactant, provision may also be made for recovery and recycle of any 1,3-dihydroxybenzene compound removed along with monohydroxy compound. Recovery and recycle of any 1,3-dihydroxybenzene compound may be performed using art-recognized methods. In any recovery and recycle method any 1,3-dihydroxybenzene compound may be separated from monohydroxy aromatic compound or utilized jointly therewith.

In various embodiments when a catalyst is employed, the catalyst may be introduced concurrently with the aforementioned molten reactants to the polymerization to avoid heating the reactants in the presence of the catalyst prior to onset of the transesterification. In other embodiments catalyst may be introduced in one or more portions. The reaction mixtures may optionally comprise stabilizers, added for example to reduce any color formation. Stabilizers include those known in the art for polyester formation by transesterification reaction in the melt. In various embodiments the transesterification reaction is performed under an inert atmosphere. In other embodiments one or more of the ingredients comprising the reaction mixture are dried before use. Any polyester oligomer may be isolated before use in step (B) or reacted directly in step (B) without isolation. In one embodiment polyester intermediate is isolated by solidification, optionally with one or more steps of increasing surface area of the solid, or solvent-washing or trituration.

Polyester oligomer intermediates from step (A) may have varying molecular weights, as well as varying ratios of hydroxy end-groups to phenyl ester end-groups. In various embodiments complete conversion to hydroxy terminated oligomers is possible and a chain stopper may be added in step (B) of the process to generate copolyestercarbonates of desired molecular weight. In other embodiments a low ratio of hydroxy end-groups to phenyl ester end-groups may be targeted in the first step, thus lowering the time and pressure requirements for the reaction as well as eliminating the need to add chain stopper in step (B).

Polyester oligomer intermediates from step (A) typically have weight average molecular weight (vs. polystyrene standards) in one embodiment of at least about 900, in another embodiment of at least about 2400, and in still another embodiment of at least about 4800. In other embodiments said oligomers have weight average molecular weights in a range of between about 900 and about 20,000, in still other embodiments in a range of between about 900 to about 15,000, in still other embodiments in a range of between about 900 to about 8,000, in still other embodiments in a range of between about 900 to about 6,000, and in still other embodiments in a range of between about 900 to about 5,000. In other embodiments said oligomers have weight average molecular weights in a range of between about 10,000 to about 40,000, and in still other embodiments about 15,000 to about 32,000. Said intermediates often have carboxylic acid end-groups in one embodiment at a level in a range of between about 30 ppm and about 15,000 ppm, in another embodiment at a level in a range of between about 30 ppm and about 5000 ppm, in another embodiment at a level in a range of between about 300 ppm and about 5000 ppm, and in still another embodiment at a level in a range of between about 300 ppm and about 1500 ppm. Said intermediates often have phenolic hydroxy end-groups at a level in a range in one embodiment of between about 2 ppm and about 37,000 ppm, in another embodiment of between about 500 ppm and about 20,000 ppm, in another embodiment of between about 1000 ppm and about 14,000 ppm, in still another embodiment of between about 1500 ppm and about 11,000 ppm, and in still another embodiment of between about 1500 ppm and about 9700 ppm. Carboxylic acid end-groups may be present through hydrolysis of ester groups under the reaction conditions and as adventitious acid groups present in dicarboxylic acid diester starting material.

In step (B) of the method a polyester oligomer is combined and reacted with reactants comprising a carbonate precursor. In one embodiment of step (B) of the method the carbonate precursor is phosgene. When phosgene is employed, this step may be conducted according to art-recognized interfacial procedures (i.e., in a two-phase water-organic solvent system) employing in various embodiments a suitable interfacial polymerization catalyst and an acid acceptor, typically an alkaline reagent, which in one embodiment is sodium hydroxide. Optionally one or both of a branching agent and a chain termination agent such as are described below may be present. At least one catalyst may be present in the two-phase system of step (B). Catalysts for polycarbonate synthesis by interfacial methods are well-known in the art and many examples are suitable for use. In one embodiment a catalyst comprises triethylamine. In one embodiment to suppress scrambling of the block copolymer, the pH is maintained at a relatively low level, typically in the range of about 4–9, for the initial part of the phosgenation reaction; it may be increased to about 10–13 during the latter part of said reaction.

In one embodiment step (B) is conducted in the absence of any organic dihydroxy compound different from hydroxy-terminated polyester intermediate. In another embodiment step (B) is conducted in the presence of at least one organic dihydroxy compound different from hydroxy-terminated polyester intermediate. In various embodiments said organic dihydroxy compound has the formula HO—$R^2$—OH, wherein $R^2$ is as previously defined. Therefore, in one embodiment the method of the present invention comprises conducting the reaction of step (B) in the presence of at least one organic dihydroxy compound of the formula HO—$R^2$—OH identical to at least one 1,3-dihydroxybenzene moiety in the polyester blocks prepared in step (A). In another embodiment the method comprises conducting the reaction of step (B) in the presence of at least one organic dihydroxy compound of the formula HO—$R^2$—OH different from any 1,3-dihydroxybenzene moiety in the polyester blocks prepared in step (A). In yet another embodiment the method comprises conducting the reaction of step (B) in the presence of a mixture of organic dihydroxy compounds of the formula HO—R—OH at least one of which is the same as and at least one of which is different from any 1,3-dihydroxybenzene moiety in the polyester blocks. In still another embodiment the method comprises conducting the reaction of step (B) in the presence of a mixture of two organic dihydroxy compounds of the formula HO—$R^2$—OH one of which is the same as and one of which is different from any 1,3-dihydroxybenzene moiety in the polyester blocks. When a mixture of dihydroxy compounds is present, then the molar ratio of dihydroxy compounds identical to those present in the polyester blocks to those dihydroxy compounds different from those present in the polyester blocks is typically about 1:999 to 999:1. In some embodiments the method comprises conducting the reaction of step (B) in the presence of a mixture of dihydroxy compounds comprising at least two of unsubstituted resorcinol, a substituted resorcinol, and bisphenol A. In another embodiment the method comprises conducting the reaction of step (B) in the presence of bisphenol A. In another embodiment the method comprises conducting the reaction of step (B) in the presence of unsubstituted resorcinol.

At least one organic dihydroxy compound different from hydroxy-terminated polyester intermediate may be introduced into the reaction mixture of step (B) through any convenient method of combination. In one embodiment at least one organic dihydroxy compound may be present as unreacted 1,3-dihydroxybenzene moiety from step (A). In another embodiment at least one organic dihydroxy compound may be added following step (A), before or during reaction with carbonate precursor in step (B). In another embodiment at least one organic dihydroxy compound is present as unreacted 1,3-dihydroxybenzene moiety from step (A) and at least one organic dihydroxy compound may be added following step (A), before or during reaction with carbonate precursor in step (B). Any dihydroxy compound added following step (A), before or during reaction with carbonate precursor in step (B), may be the same as or different from any 1,3-dihydroxybenzene moiety present initially in step (A). In a particular embodiment at least one organic dihydroxy compound comprises at least one unsubstituted resorcinol or substituted resorcinol from step (A) and at least one dihydroxy compound added following step (A) different from unsubstituted resorcinol or substituted resorcinol. In some embodiments a molar excess of resorcinol (relative to total moles dicarboxylic acid diester present) is employed in step (A), in which case there may be some unreacted resorcinol remaining, and bisphenol A is added before or during reaction with carbonate precursor in step (B). The amount of any 1,3-dihydroxybenzene moiety remaining unreacted from step (A) is in one embodiment less than about 15 mole %, in another embodiment less than about 10 mole %, and in another embodiment less than about 5 mole % of the 1,3-dihydroxybenzene moiety initially present in step (A). In another embodiment the amount of 1,3-dihydroxybenzene moiety remaining unreacted from step (A) is less than about 2 mole % of the 1,3-dihydroxybenzene moiety initially present in step (A).

The amount of any dihydroxy compound added following step (A) may be that required to provide at least one polycarbonate block with a desired degree of polymerization. In one embodiment the amount of any dihydroxy compound added following step (A) is such that the a polycarbonate block has a degree of polymerization of at least 1, in another at least about 3, in another embodiment at least about 10 and in still another embodiment in a range of about 20–200. In some embodiments the amount of any dihydroxy compound added following step (A) is such that a polycarbonate block has a degree of polymerization between about 20 and 50.

At least one chain-stopper (also referred to sometimes hereinafter as capping agent) may also be present in step (B), and said chain-stopper may be incorporated into the structures of copolyestercarbonates of the invention. A chain-stopper may comprise at least one mono-phenolic compound. In some embodiments at least one chain-stopper may be present in quantities of about 0.05 to about 10 mole %, based on total dihydroxy compounds used in step (B), or, when no additional dihydroxy compound is used in step (B), based on total dihydroxy compounds used in step (A).

Suitable mono-phenolic compounds as chain-stoppers include monocyclic phenols, such as phenol, $C_1$–$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, preferably in which about 47 to 89% of the hydrogen atoms are part of methyl groups as described in U.S. Pat. No. 4,334,053. For some embodiments the use of a mono-phenolic UV screener as capping agent is preferred. Such compounds include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. Especially preferred mono-phenolic chain-stoppers are phenol, p-cumylphenol, and resorcinol monobenzoate.

Suitable mono-carboxylic acid chlorides as chain-stoppers include monocyclic, mono-carboxylic acid chlorides, such as benzoyl chloride, $C_1$–$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryloyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

In another embodiment the method of the invention may encompass the inclusion of at least one branching agent in either or both of step (A) and step (B). Said branching agent may be incorporated into the structures of the copolyestercarbonates of the invention. Suitable branching agents comprise trifunctional or higher functional carboxylic acid esters and/or trifunctional or higher functional phenolic compounds. Such branching agents, if included, can preferably be used in quantities of 0.005 to 1 mole %, based on dicarboxylic acid diesters present in step (A) or on total dihydroxy compound present in step (B), respectively. Illustrative examples of suitable branching agents comprise trifunctional or higher carboxylic acid esters, such as trimesic acid triarylester, cyanuric acid triarylester, 3,3',4,4'-benzophenone tetracarboxylic acid tetraarylester, 1,4,5,8-naphthalene tetracarboxylic acid tetraarylester or pyromellitic acid tetraarylester, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytri-phenyl)methyl]-benzene. In some embodiments triarylesters are triphenylesters.

Following completion of both reactions, the block copolyestercarbonate may be used in solution or transferred by any convenient procedure to some other solvent for use. In some embodiments the copolyestercarbonate is recovered and isolated from solution by conventional procedures. These procedures may comprise, for example, at least one of anti-solvent precipitation, washing, drying and devolatilization-pelletization via extrusion.

The block copolyestercarbonates of this invention are polymers having excellent physical properties. Their light transmitting properties may be similar to those of polycarbonates. Thus, they are often substantially transparent and may often be employed as substitutes for polycarbonates in the fabrication of transparent sheet material when improved weatherability is mandated.

Block copolyestercarbonates made by the method of the present invention have in one embodiment less than about 500 ppm, in another embodiment less than about 100 ppm, in another embodiment less than about 50 ppm, in another embodiment less than about 20 ppm, in another embodiment less than about 10 ppm, and in still another embodiment less than about 5 ppm phenolic end-groups. In yet another embodiment phenolic end-groups in block copolyestercarbonates of the invention are essentially undetectable using standard analytical methods. Said copolymers contain in one embodiment less than about 100 ppm, in another embodiment less than about 50 ppm, in another embodiment less than about 25 ppm, and in another embodiment less than about 10 ppm free 1,3-dihydroxybenzene moiety. The copolymers have in one embodiment less than about 1000 ppm, in another embodiment less than about 500 ppm, in another embodiment less than about 200 ppm, in another embodiment less than about 100 ppm, in another embodiment less than about 50 ppm, in another embodiment less than about 10 ppm, and in still another embodiment less than about 5 ppm carboxylic acid end-groups. In yet another embodiment carboxylic acid end-groups in block copolyestercarbonates of the invention are essentially undetectable using standard analytical methods. The concentration of carboxylic acid end-groups in the copolyestercarbonates is in one embodiment less than that present in the polyester intermediate from step (A). Any carboxylic acid end-groups in said polyester intermediate may react with carbonate precursor in step (B). For example, when phosgene is the carbonate precursor, carboxylic acid groups may react to form carboxylic acid chlorides which may then react with any phenolic groups present.

In another of its embodiments the present invention comprises methods for making thermally stable oligomeric polyester intermediates and block copolyestercarbonates. In the present context thermally stable means that the polymers show decrease in molecular weight in one embodiment of less than about 20%, in another embodiment of less than about 10%, and in another embodiment of less than about 5% upon heating said polymers at a temperature of about 280–290° C. for five minutes. Although the scope of the invention is not intended to be limited by theory, it is believed that thermal stability may be related to the presence or absence of anhydride linkages. The presence of anhydride linkages may also result in lowered hydrolytic stability in the polyester intermediates and copolyestercarbonates. Typical anhydride linkages are illustrated in Formula (XI).

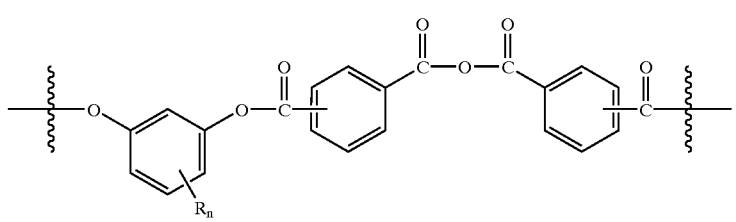

(XI)

Such anhydride linkages link at least two mers in a polymer chain and may arise through combination of two isophthalate or terephthalate moieties or mixtures thereof, although it is to be understood that anhydride linkages may arise through combination of any suitable similar dicarboxylic acid residues or mixtures of suitable dissimilar dicarboxylic acid residues present in a reaction mixture. The presence of anhydride linkages may result in thermal molecular weight loss outside the range cited hereinabove. In some embodiments either or both of polyester intermediates and copolyestercarbonates are substantially free of anhydride linkages. Substantially free of anhydride linkages in the present context means that a polymer has thermal molecular weight loss within the range cited hereinabove. Anhydride linkages may also be detected by means known to those skilled in the art such as by $^{13}C$ nuclear magnetic resonance spectroscopy (NMR). After thermal processing (for example, extrusion and/or molding), the molecular weight of copolyestercarbonate containing anhydride linkages often decreases, and the anhydride NMR resonances typically decrease. Anhydride linkages may also be detected by reaction of polymer with a nucleophile, such as a secondary amine. For example, polyester intermediate or copolyestercarbonate may be dissolved in a convenient solvent, such as methylene chloride, and treated with a secondary amine, such as dibutylamine or diisobutylamine, for several minutes at ambient temperature. Comparison of the starting polymer molecular weight to that after amine treatment typically shows a decrease in molecular weight which may be correlated with the corresponding decrease observed under typical thermal processing conditions. Although the invention is not meant to be limited by theory, it is believed that nucleophiles, such as secondary amine and phenolic, attack anhydride linkages (as opposed to ester linkages) selectively under the reaction conditions. The decrease in molecular weight upon reaction with amine nucleophile is therefore an indication of the presence of anhydride functionality in the polymer.

In one of its embodiments the present invention comprises the copolyestercarbonates as described. In some embodiments of methods of making said copolyestercarbonates there may be present following step (B) some polyester intermediate from step (A) which is not covalently bound to a carbonate moiety. For example there may be present a polyester intermediate possessing end-groups which may not be reactive with carbonate precursor. Illustrative examples of end-groups comprise carboxylic acid, carboxylic acid ester, carboxylic acid chloride or end-capped species without any functional group. Therefore, in another of its embodiments the present invention comprises the said copolyestercarbonates in combination with polyester homopolymer containing structural units comprising those of the polyester blocks in the copolyestercarbonate, said polyester homopolymer being made in step (A) of the same process as said copolyestercarbonate. When it is desired to isolate substantially pure copolyestercarbonate, then the level of said polyester homopolymer present in copolyestercarbonate is in one embodiment less than about 20 wt. %, in another embodiment less than about 10 wt. % and in still another embodiment less than about 4 wt. % of copolyestercarbonate. In some embodiments the level of said polyester homopolymer is less than about 1 wt. % of copolyestercarbonate isolated substantially pure. When it is desired to prepare a blend of copolyestercarbonate with polyester homopolymer through synthesis in steps A and B, then in some embodiments proportions of the copolyestercarbonates in such blends comprise up to about 80 wt. % of the composition.

When an organic dihydroxy compound different from the 1,3-dihydroxybenzene moiety of step (A) is present in step (B), then some portion of said dihydroxy compound may undergo transesterification with ester blocks in both copolyestercarbonate and in any polyester homopolymer that might be present, depending upon reaction parameters such as pH and temperature. Therefore, in another of its embodiments the present invention comprises the said copolyestercarbonates in combination with polyester copolymer with structural units comprising 1,3-dihydroxybenzene moieties from step (A) and any organic dihydroxy compound added for step (B), both in combination with aromatic dicarboxylic acid moieties as described, said polyester copolymer being derived from the synthesis process. The level of said polyester copolymer present in copolyestercarbonate is in one embodiment less than about 20 wt. %, in another embodiment less than about 5 wt. % and in still another embodiment less than about 2 wt. % of copolyestercarbonate. In another embodiment the level of said polyester copolymer is less than about 1 wt. % of copolyestercarbonate.

In yet another of its embodiments the present invention comprises copolyestercarbonates in which a portion of the ester blocks have undergone transesterification with and incorporation of some portion of organic dihydroxy compound added in step (B) as described above. For example, in one embodiment copolyestercarbonates may be produced in which an organic dihydroxy compound such as bisphenol A is incorporated into a portion of the ester blocks, either before, during, or after carbonate block formation with hydroxy-terminated polyester intermediate. The level of said organic dihydroxy compound added in step (B) incorporated into said ester blocks is in one embodiment less than about 20 wt. %, in another embodiment less than about 5 wt. % and in still another embodiment less than about 2 wt. % of copolyestercarbonate. In another embodiment the level of incorporation of said organic dihydroxy compound added in step (B) into said ester blocks is less than about 1 wt. % of copolyestercarbonate.

When step (B) is performed in the presence of at least one organic dihydroxy compound different from hydroxy-terminated polyester intermediate produced in step (A), then polycarbonate homopolymer may be formed which is not covalently bound to polyester intermediate. Therefore, in another of its embodiments the present invention comprises the said copolyestercarbonates in combination with polycarbonate homopolymer containing structural units comprising those of the polycarbonate blocks in the copolyestercarbonate, said polycarbonate homopolymer being made in step (B) of the same process as said copolyestercarbonate. When it is desired to isolate substantially pure copolyestercarbonate, then the level of said polycarbonate homopolymer present in copolyestercarbonate is in one embodiment less than about 20 wt. %, in another embodiment less than about 10 wt. % and in still another embodiment less than about 4 wt. % of copolyestercarbonate. In another embodiment the level of said polycarbonate homopolymer is less than about 2 wt. % of copolyestercarbonate isolated substantially pure. When it is desired to prepare a blend of copolyestercarbonate with at least one polycarbonate homopolymer through synthesis in steps A and B, then at least one polycarbonate homopolymer in the blends may be prepared essentially simultaneously with carbonate block formation in the copolyestercarbonate in step (B). Alternatively, at least one polycarbonate homopolymer in the blends may be prepared after the block copolyestercarbonate formation is at least partially or essentially complete, for example, in one option, through addition of more organic dihydroxy compound, carbonate precursor, and chain stopper. The proportions of the copolyestercarbonates in such blends are determined chiefly by the resulting proportions of ester blocks, which are believed to comprise the active weatherability-improving entities, typical proportions providing in various embodiments about 10–50% by weight of ester blocks in the blend. Typically blends of copolyestercarbonate with up to about 95 wt. % polycarbonate homopolymer may be prepared, if desired, through synthesis in steps A and B. In a particular embodiment blends of copolyestercarbonate comprising bisphenol A carbonate blocks may be prepared along with bisphenol A polycarbonate homopolymer through synthesis in step (A) and step (B) in the presence of phosgene.

In some embodiments when step (B) is performed in the presence of at least one organic dihydroxy compound different from hydroxy-terminated polyester intermediate produced in step (A), then a new polyester homopolymer may be formed through reaction, for example, of some portion of said organic dihydroxy compound with any aromatic dicarboxylic acid species present in the reaction mixture. In some embodiments aromatic dicarboxylic acids may be present in the reaction mixture of step (A), for example through adventitious hydrolysis of aromatic dicarboxylic acid diester or as impurities initially present in aromatic dicarboxylic acid diester. In one embodiment said aromatic dicarboxylic acids may be converted to the corresponding dicarboxylic acid dichlorides through reaction with phosgene in step (B). Therefore, in another of its embodiments the present invention comprises the said copolyestercarbonates in combination with polyester homopolymer containing structural units comprising organic dihydroxy compound added in step (B) in combination with aromatic dicarboxylic acid moieties as described, said polyester homopolymer being made in the same process as said copolyestercarbonate. The level of said polyester homopolymer present in copolyestercarbonate is in one embodiment less than about 12 wt. %, in another embodiment less than about 6 wt. % and in still another embodiment less than about 4 wt. % of copolyestercarbonate. In another embodiment the level of said polyester homopolymer is less than about 2 wt. % of copolyestercarbonate. In an illustrative embodiment bisphenol A polyester derived from bisphenol A added in step (B) may be present in the copolyestercarbonates of the invention.

It is believed that the weatherability and certain other beneficial properties of the copolyestercarbonates of the invention are attributable, at least in part, to the occurrence of thermally or photochemically induced Fries rearrangement of arylate blocks to yield o-hydroxybenzophenone moieties or analogs thereof which serve as stabilizers to UV radiation. More particularly, at least a portion of arylate polyester chain members can rearrange to yield chain members with at least one hydroxy group ortho to at least one ketone group. Such rearranged chain members are typically o-hydroxybenzophenone-type chain members comprising one or more of the following structural moieties of formulas (XII)–(XIV):

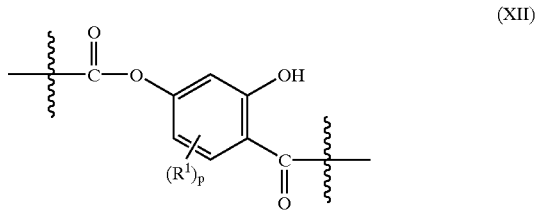

(XII)

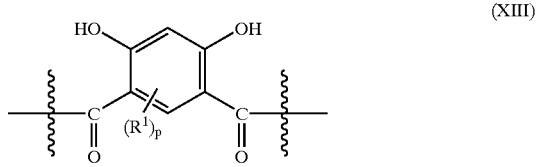

(XIII)

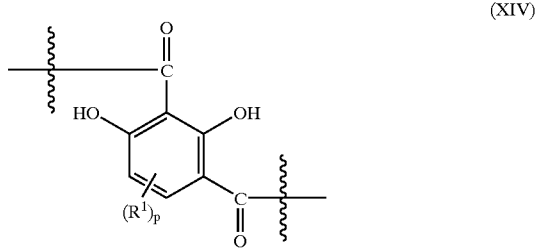

(XIV)

wherein $R^1$ and p are as previously defined. Thus, in one of its embodiments the present invention comprises compositions containing copolyestercarbonates containing structural units comprising those shown in formula (XV) wherein $R^1$, $R^2$, p, m, and n are as previously defined:

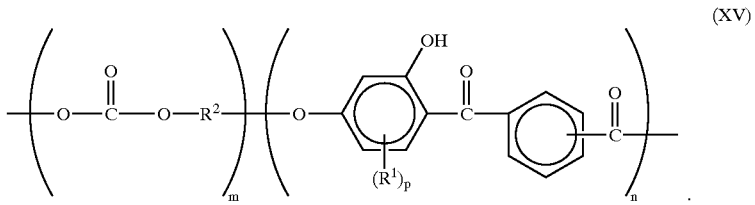

(XV)

It is also contemplated to introduce moieties of the types illustrated in formulas (XII), (XIII), and (XIV) via synthesis and polymerization of appropriate monomers in copolyestercarbonates. In one embodiment the present invention provides copolyestercarbonates comprising structural units represented by formulas (XVI) and (XVII):

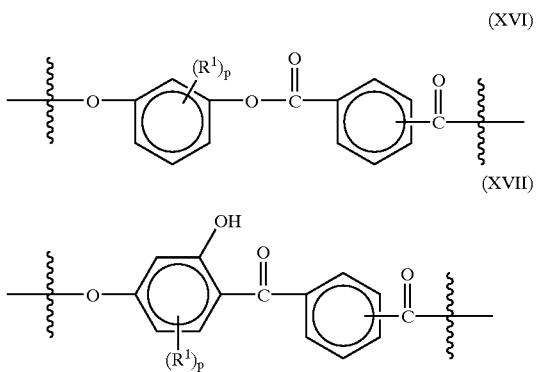

wherein $R^1$ and p are as previously defined and wherein the molar ratio of structural units represented by formula (XVI) to structural units represented by formula (XVII) ranges from about 99:1 to about 1:1, and preferably from about 99:1 to about 80:20. Although iso- and terephthalate units are illustrated in formulas (XVI) and (XVII), the dicarboxylic acid residues in the ester blocks may be derived from any suitable dicarboxylic acid residue, as defined hereinabove, or mixture of suitable dicarboxylic acid residues. In various embodiments p in both formulas (XVI) and (XVII) is zero and the ester blocks comprise dicarboxylic acid residues derived from a mixture of iso- and terephthalic acid residues, wherein the molar ratio of isophthalate to terephthalate is about 0.25–4.0:1, preferably about 0.4–2.5:1, and more preferably about 0.67–1.5:1.

The copolyestercarbonates may be employed in blends with other polymers, especially condensation polymers such as polycarbonates, polyesters, copolyestercarbonates, polyarylates, polyetherimides, polyphenylene ethers; and addition polymers. The polycarbonates in blend compositions of the invention are, for the most part, similar in molecular structure to the carbonate blocks of the copolyestercarbonate as described hereinabove, with illustrative examples being bisphenol A homo- and copolycarbonates. Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), polyethylene naphthalate) (hereinafter sometimes designated "PEN"), poly(1,4-butylene naphthalate) (hereinafter sometimes designated "PBN"), poly(cyclohexanedimethanol terephthalate) (hereinafter sometimes designated "PCT"), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and especially poly(alkylene arenedioates), with polyethylene terephthalate) and poly(1,4-butylene terephthalate) being preferred.

Polyarylates that may be employed in blends comprise those known in the art. They often comprise structural units derived from aromatic dihydroxy compounds and aromatic dicarboxylic acid compounds described herein as suitable for preparation of polycarbonates, polyesters, and copolyestercarbonates. In various embodiments polyarylates comprise those with structural units comprising the 1,3-dihydroxybenzene moiety present in the ester blocks of the copolyestercarbonates, those with structural units comprising any organic dihydroxy compound added in the carbonate block formation step in synthesis of said copolyestercarbonates, and those with structural units comprising both of the aforementioned dihydroxy moieties. In illustrative embodiments polyarylates comprise terephthalate and/or isophthalate structural units in combination with one or more of unsubstituted resorcinol, substituted resorcinol, and bisphenol A. The polyetherimide resins are generically known compounds whose preparation and properties are described in numerous publications and U.S. Patents, and include those available from General Electric Plastics under the tradename ULTEM.

Suitable addition polymers comprise homopolymers and copolymers, especially homopolymers of alkenylaromatic compounds, such as polystyrene, including syndiotactic polystyrene, and copolymers of alkenylaromatic compounds with ethylenically unsaturated nitriles, such as acrylonitrile and methacrylonitrile; dienes, such as butadiene and isoprene; and/or acrylic monomers, such as ethyl acrylate. These latter copolymers comprise the ABS (acrylonitrile-butadiene-styrene) and ASA (acrylonitrile-styrene-alkyl acrylate) copolymers. Suitable addition polymers also comprise acrylic polymers such as those of (meth)acrylamides or of alkyl (meth)acrylates such as poly(methyl methacrylate) ("PMMA"), wherein the nomenclature "meth(acryl . . . )" indicates that both acryl and methacryl polymers are designated.

Proportions of the block copolyestercarbonates in such blends are determined chiefly by the resulting proportions of ester blocks, which comprise the active weatherability-improving entities, typical proportions providing about 10–50% by weight of ester blocks in the blend. By reason of some degree of incompatibility between the block copolyestercarbonates of the invention and the various polymers in which they may be incorporated, said blends are often not transparent. However, transparent blends may often be prepared, if desired, by adjusting the length of the ester blocks in the block copolyestercarbonates. The other properties of said blends are excellent.

The blend compositions of the invention may be prepared by such conventional operations as solvent blending or melt blending as by an extrusion process. They may additionally contain art-recognized additives including, but not limited to, impact modifiers, UV screeners, UV absorbers, flame retardants, stabilizers, color stabilizers, heat stabilizers, ester interchange inhibitors, flow aids and mold release agents. The blends may contain fillers such as glass fibers, glass fiber fabric, chopped glass, knit glass fiber fabric, glass spheres, KEVLAR fiber, polyphenylene sulfide fiber, woven basalt fiber fabric, silicates, zeolites, titanium dioxide, stone powder, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, talc, clay, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic. In addition It is intended that the blend compositions comprise simple physical blends and any reaction products thereof, for example, as illustrated by polyester-polycarbonate transesterification products.

The present invention also comprises articles comprising copolyestercarbonates made by methods disclosed herein. Such articles generally display resistance to weathering due to the presence of said copolyestercarbonates. In some embodiments such articles may be monolithic, composite, or multilayer. In various embodiments articles comprise those consisting essentially of copolyestercarbonate optionally containing art-recognized additives as described herein. In other embodiments articles comprise those consisting essentially of copolyestercarbonate in a blend with at least one other thermoplastic resin optionally containing art-recognized additives as described herein.

In a particular embodiment the present invention comprises multilayer articles comprising a substrate layer comprising at least one thermoplastic polymer, thermoset polymer, cellulosic material, glass, ceramic, or metal, and at least one coating layer thereon, said coating layer comprising at least one copolyestercarbonate comprising structural units derived from at least one 1,3-dihydroxybenzene moiety and at least one aromatic dicarboxylic acid moiety, and prepared by methods embodied in the present invention. In the present context a multilayer article is one containing at least two layers. In various embodiments a coating layer comprises at least one thermally stable copolyestercarbonate comprising resorcinol arylate polyester chain members substantially free of anhydride linkages linking at least two mers of the polymer chain. Optionally, the multilayer articles may further comprise an interlayer, for example an adhesive interlayer (sometimes known as a tie-layer), between any substrate layer and any thermally stable polymer coating layer. Multilayer articles of the invention comprise those which comprise a substrate layer and a coating layer of said thermally stable polymer; those which comprise a substrate layer with a coating layer of said thermally stable polymer on each side of said substrate layer; and those which comprise a substrate layer and at least one coating layer of said thermally stable polymer with at least one interlayer between a substrate layer and a coating layer. Any interlayer may be transparent, translucent, or opaque, and/or may contain an additive, for example a colorant or decorative material such as metal flake. If desired, an overlayer may be included over the coating layer of thermally stable polymer, for example to provide abrasion or scratch resistance. The substrate layer, coating layer of thermally stable polymer, and any interlayers or overcoating layers are preferably in contiguous superposed contact with one another.

Within the context of the present invention it should be understood that any coating layer comprising a thermally stable polymer comprising resorcinol arylate polyester chain members may also comprise polymer comprising o-hydroxybenzophenone or analogous chain members resulting from Fries rearrangement of said resorcinol arylate polyester chain members, for example after exposure of said coating layer to UV-light. Typically, a preponderance of polymer comprising o-hydroxybenzophenone or analogous chain members will be on that side or sides of said coating layer exposed to UV-light and will overlay in a contiguous superposed layer or layers that polymer comprising unrearranged resorcinol arylate polyester chain members. If it is worn away or otherwise removed, polymer comprising o-hydroxybenzophenone or analogous chain members is capable of regenerating or renewing itself from the resorcinol arylate-containing layer or layers, thus providing continuous protection for any UV-light sensitive layers.

Coating layers and any intermediate layers may optionally contain art-recognized additives, illustrative examples of which comprise color stabilizing additives, heat stabilizers, UV screeners, and auxiliary UV absorbers. For example, illustrative UV absorbers comprise hydroxybenzophenones, hydroxybenzotriazoles, hydroxybenzotriazines, cyanoacrylates, oxanilides, and benzoxazinones. Illustrative UV absorbers also comprise nano-size inorganic materials such as titanium oxide, cerium oxide, and zinc oxide, all with particle size less than about 100 nanometers. Illustrative examples of stabilizer additives also comprise carbodiimides, such as bis-(2,6-diisopropylphenyl) carbodiimide and polycarbodiimides; hindered amine light stabilizers; hindered phenols; phosphites and phosphorous acid. Such stabilizer additives are known in the art and are disclosed in standard reference works such as "Plastics Additives Handbook", 5th edition, edited by H. Zweifel, Hanser Publishers. In some embodiments mixtures of stabilizer additives are particularly effective, especially mixtures of the abovementioned stabilizer additives.

The amount of any stabilizer additive employed is in one embodiment in a range between about 0.0005 wt. % and 10 wt. %, in another embodiment in a range between about 0.001 wt. % and about 10 wt. %, in another embodiment in a range between about 0.04 wt. % and about 8 wt. %, in another embodiment in a range between about 0.01 wt. % and about 6 wt. %, in another embodiment in a range between about 0.2 wt. % and about 5 wt. %, in another embodiment in a range between about 0.5 wt. % and about 5 wt. %, and in still another embodiment in a range between about 1 wt. % and about 5 wt. % based on the weight of copolyestercarbonate in a coating layer. A stabilizer additive may be combined with coating layer using known methods. In one embodiment stabilizer additive is at least partially dissolved in a solution with components of a coating layer, and a film of coating layer comprising stabilizer additive is solvent cast. In another embodiment stabilizer additive is at least partially dissolved in a solution and impregnated from said solution into solid or at least partially solid coating layer. In still another embodiment stabilizer additive is combined with coating layer in a melt method such as co-extrusion. If desired, the stabilizer additive may be combined with coating layer in the form of a solution of stabilizer additive, for example in water or organic solvent. In one embodiment an aqueous solution of phosphorous acid is employed as stabilizer additive.

It is also within the scope of the invention for other polymers to be present which are miscible in at least some proportions with a polymer coating layer comprising at least one thermally stable copolyestercarbonate comprising structural units derived from at least one 1,3-dihydroxybenzene moiety and at least one aromatic dicarboxylic acid moiety. Illustrative examples of at least partially miscible polymers comprise polyetherimide and polyesters such as PBT, PET, PTT, PEN, PBN, PETG, PCCD, and bisphenol A polyarylate. Preferably, the coating layer polymer consists essentially of thermally stable resorcinol arylate copolyestercarbonates, optionally containing art-recognized additives.

The material of the substrate layer in the articles of this invention may be at least one thermoplastic polymer, whether addition or condensation prepared. Thermoplastic polymers comprise polycarbonates, particularly aromatic polycarbonates, polyacetals, polyarylene ethers, polyphenylene ethers, polyarylene sulfides, polyphenylene sulfides, polysulfones, polyimides, polyamideimides, polyetherimides, polyetherketones, polyaryletherketones, polyetheretherketones, polyetherketoneketones, polyamides, polyesters, liquid crystalline polyesters, polyetheresters, polyetheramides, polyesteramides, and polyestercarbonates (other than those employed for the coating layer, as defined herein). Polycarbonates and polyesters are frequently preferred. A substrate layer may additionally contain art-recognized additives including, but not limited to, colorants, pigments, dyes, impact modifiers, stabilizers, color stabilizers, heat stabilizers, UV screeners, UV absorbers, flame retardants, fillers, flow aids, ester interchange inhibitors, and mold release agents.

Suitable polycarbonates (hereinafter sometimes designated "PC") comprise polycarbonates comprising structural units of the types described for organic carbonate blocks in copolyestercarbonates of the invention. In various embodiments polycarbonates are bisphenol A homo- and copolycarbonates. In one embodiment the weight average molecular weight of the initial polycarbonate ranges from about 5,000 to about 100,000, and in another embodiment from about 25,000 to about 65,000.

The polycarbonate substrate may also be a copolyestercarbonate (other than that copolyestercarbonate employed for the coating layer as defined hereinafter). Such copolymers typically comprise, in addition to the organic carbonate units, ester units such as isophthalate and/or terephthalate. The copolyestercarbonates which find use in the instant invention and the methods for their preparation are well known in the art as disclosed in, for example, U.S. Pat. Nos. 3,030,331; 3,169,121; 3,207,814; 4,156,069; 4,194,038; 4,238,596; 4,238,597; 4,487,896; and 4,506,065.

Polyester substrates comprise poly(alkylene dicarboxylates), especially poly(ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate). Also included are polyarylates, illustrative examples of which comprise those comprising structural units derived from bisphenol A, terephthalic acid, and isophthalic acid.

Suitable addition polymer substrates comprise homo- and copolymeric aliphatic olefin polymers and functionalized olefin polymers (which are homopolymers and copolymers comprising structural units derived from either aliphatic olefins or functionalized olefins or both), and their alloys or blends. Illustrative examples comprise polyethylene, polypropylene, thermoplastic polyolefin (sometimes referred to in the art as "TPO"), poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) (sometimes referred to as "PMMA"), and polymers of alkenylaromatic compounds such as polystyrenes, including syndiotactic polystyrene. The preferred addition polymers for many purposes are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends comprise those comprising PC/ABS, PC/ASA, PC/PBT, PC/PET, PC/polyetherimide, PC/polysulfone, polyester/polyetherimide, PMMA/acrylic rubber, polyphenylene ether/polystyrene, polyphenylene ether/polyamide or polyphenylene ether/polyester. Although the substrate layer may incorporate other thermoplastic polymers, the above-described polycarbonates and/or addition polymers still more preferably constitute the major proportion thereof.

The substrate layer in the multilayer articles of this invention may also comprise at least one of any thermoset polymer. Suitable thermoset polymer substrates comprise those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. In one embodiment of the invention the thermoset polymer substrate comprises a RIM material. In one embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment of the invention a thermoplastic or thermoset substrate layer also incorporates at least one filler and/or pigment. Illustrative extending and reinforcing fillers, and pigments comprise silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In another embodiment the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Multilayer articles encompassed by the invention also comprise those comprising at least one glass layer. Typically any glass layer is a substrate layer, although multilayer articles comprising a thermally stable polymer coating layer interposed between a glass layer and a substrate layer are also contemplated. Depending upon the nature of coating and glass layers, at least one adhesive interlayer may be beneficially employed between any glass layer and any thermally stable polymer coating layer. The adhesive interlayer may be transparent, opaque or translucent. For many applications it is preferred that the interlayer be optically transparent in nature and generally have a transmission of greater than about 60% and a haze value less than about 3% with no objectionable color.

Metal articles exposed to UV-light may exhibit tarnishing and other detrimental phenomena. In another embodiment the invention encompasses multilayer articles comprising at least one metal layer as substrate layer. Representative metal substrates comprise those comprising brass, aluminum, magnesium, chrome, iron, steel, copper, and other metals or alloys or articles containing them, which may require protection from UV-light or other weather phenomena. Depending upon the nature of coating and metal layers, at least one adhesive interlayer may be beneficially employed between any metal layer and any thermally stable polymer coating layer.

Another aspect of the invention is a method for preparing a multilayer article which comprises applying at least one thermally stable coating layer to a second layer, said second layer comprising at least one thermoplastic polymer, thermoset polymer, cellulosic material, glass, or metal, and said coating layer comprising at least one copolyestercarbonate comprising structural units derived from at least one 1,3-dihydroxybenzene moiety and at least one aromatic dicarboxylic acid moiety, the polymer being substantially free of anhydride linkages linking at least two mers of the polymer chain.

In one embodiment of the invention, at least one thermally stable coating layer is applied to a second layer, which may be the substrate layer or at least one intermediate layer ultimately to be disposed between the coating and substrate layers. An intermediate layer may comprise any of the materials suitable for use as the substrate or coating layer, and may further contain fillers and colorants such as described hereinabove. When necessary, it may be specifically chosen so as to provide good adhesion between substrate and coating layers. Colorants of the previously described types may also be present in the coating layer.

In one embodiment application of at least one coating layer may be performed by solvent-casting. In another embodiment application of said coating layer comprises fabrication of a separate sheet thereof followed by application of the coating layer sheet to the second layer, or by simultaneous production of both layers, typically in a melt process. Thus, there may be employed such methods as thermoforming, compression molding, co-injection molding, coextrusion, overmolding, blow molding, multi-shot injection molding and placement of a film of the coating layer material on the surface of the second layer followed by adhesion of the two layers, typically in an injection molding apparatus; e.g., in-mold decoration, or in a hot-press. These operations may be conducted under art-recognized conditions.

It is also within the scope of the invention to apply a structure comprising the coating layer and the second layer to a third, substrate layer, which may be, for example, of a thermoplastic, thermoset, metal, or cellulosic material similar or identical to that of the second layer but different from that of the coating layer. This may be achieved, for example, by charging an injection mold with the structure comprising the coating layer and the second layer and injecting the substrate sheet material behind it. By this method, in-mold decoration and the like are possible. Both sides of the substrate layer may receive the other layers, though it is usually preferred to apply them to only one side.

The thicknesses of the various layers in multilayer articles of this invention are most often as follows:

substrate—at least about $125\mu$ (microns), or at least about $250\ \mu$, or at least about $400\mu$, coating—about 2–2,500, or about 10–250 or about $50$–$175\mu$, second material, if any—about 2–2,500, or about 10–250, or about $50$–$175\mu$, total—at least about $125\mu$, or at least about $250\mu$, or at least about $400\mu$.

The articles of this invention are typically characterized by the usual beneficial properties of the substrate layer, in addition to weatherability as may be evidenced by such properties as improved initial gloss, improved initial color, improved resistance to ultraviolet radiation and maintenance of gloss, improved impact strength, and resistance to organic solvents encountered in their final applications. Depending upon such factors as the coating layer/substrate combination, the multilayer articles may possess recycling capability, which makes it possible to employ the regrind material as a substrate for further production of articles of the invention.

Multilayer articles which can be made which comprise copolyestercarbonates of the invention comprise those involving outdoor use and storage and hence requiring resistance to weathering. Illustrative applications comprise aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

Molecular weights were determined in chloroform by gel permeation chromatography (GPC) relative to polystyrene and are reported as weight average ($M_w$) or number average ($M_n$).

EXAMPLE 1

Into a glass reactor equipped with a stir shaft, Dean Stark trap with Vigreux column and vacuum attachment was charged resorcinol (3.03 g, 0.0275 moles), diphenylisophthalate (3.98 g, 0.0125 moles), diphenylterephthalate (3.98 g, 0.0125 moles), lithium hydroxide (2.2 milligrams [mg]), and tetramethylammonium hydroxide (10 microliters of 25 wt % solution). A nitrogen atmosphere was established (3 vacuum purges) and slow stirring begun. The reactor was lowered into a salt bath controlled at about 200° C. After 15 minutes the pressure was reduced to 100 Torr. This pressure and temperature were maintained for 45 minutes during which time about 1 mL of phenol was collected. The pressure was then lowered to 50 Torr and maintained for 60 minutes, collecting an additional 1 mL of phenol. The temperature was then raised to 220° C. and after 60 minutes an additional 1.2 mL of phenol was obtained. For the next 30 minutes the reactor was held at 220° C. and 25 Torr. Finally, the temperature increased to 240° C. and full vacuum applied for 45 minutes, the final amount of phenol being about 3.5 ML (80% of theory). The viscous amber colored material was poured onto an aluminum pan, yielding 4.5 grams. GPC analysis indicated a Mw of 8,026. The Tg of this material was 112° C. A similar reaction was conducted yielding 4.06 g of polyester oligomers with a Mw of 8,327 and a Tg of 115° C.

Into a 5-neck Morton round bottomed flask equipped with a pH electrode, phosgene addition tube, condenser, caustic addition port, and a stirring shaft was charged polyester oligomers (7.0 g obtained by combining the two polyester materials above), methylene chloride (100 mL) deionized water (100 mL), and triethylamine (200 microliters). The pH of the reaction mixture was taken to 9 and phosgene added (1.5 g, 0.5 g/min). The pH was maintained at 9 for the entire phosgenation. The reaction mixture was separated, the organic phase washed with hydrochloric acid (1N), hydrochloric acid (0.1N) and twice with water, and the polymer was isolated by precipitation in hot water. The Mw of the isolated material was 13,202.

EXAMPLE 2

Into a glass reactor equipped with a stir shaft, Dean Stark trap with Vigreux column and vacuum attachment was charged resorcinol (3.03 g, 0.0275 moles), diphenylisophthalate (3.98 g, 0.0125 moles), diphenylterephthalate (3.98 g, 0.0125 moles), lithium hydroxide (2.2 mg), and tetramethylammonium hydroxide (10 microliters of 25 wt % solution). A nitrogen atmosphere was established (3 vacuum purges) and slow stirring begun. The reactor was lowered into a salt bath controlled at about 200° C. After 15 minutes the pressure was reduced to 100 Torr. This pressure and temperature were maintained for 45 minutes during which time about 2.2 mL of phenol was collected. The pressure was then lowered to 50 Torr and maintained for 30 minutes, collecting an additional 0.8 mL of phenol. The temperature was then raised to 220° C. and after 30 minutes a cumulative total of about 3.2 mL of phenol had been obtained. For the next 30 minutes the reactor was held at 220° C. and 25 Torr, then 240° C. and 25 Torr for 30 minutes. Finally, the temperature held at 240° C. and full vacuum applied for 60 minutes, the final amount of phenol being about 3.8 mL (86% of theory). The viscous amber colored material was poured onto an aluminum pan, yielding 3.1 grams. An additional 2.6 g was chipped out of the reactor after cooling. GPC analysis indicated a Mw of 9,891. The Tg of this material was 118° C.

Into a 5-neck Morton round bottomed flask equipped with a pH electrode, phosgene addition tube, condenser, caustic addition port, and a stirring shaft was charged polyester oligomers (5.8 g), bisphenol A (3.8 g, 0.016 moles), methylene chloride (100 mL), deionized water (100 mL), and triethylamine (200 microliters). The pH of the reaction mixture was taken to 10 and phosgene added (3.4 g, 0.75 g/min). The pH was maintained at 10 for the entire phosgenation. The reaction mixture was separated, the organic phase washed with hydrochloric acid (1N), hydrochloric acid (0.1N) and twice with water, and the polymer was isolated by precipitation in hot water. The Mw of the isolated material was 24,513.

EXAMPLE 3

Into a glass reactor equipped with a stir shaft, Dean Stark trap with Vigreux column and vacuum attachment was charged resorcinol (3.03 g, 0.0275 moles), diphenylisophthalate (3.98 g, 0.0125 moles), diphenylterephthalate (3.98 g, 0.0125 moles), lithium hydroxide (3.5 mg), and tetramethylammonium hydroxide (10 microliters of 25 wt % solution). A nitrogen atmosphere was established (3 vacuum purges) and slow stirring began. The reactor was lowered into a salt bath controlled at about 200° C. After 15 minutes the pressure was reduced to 100 Torr. This pressure and temperature were maintained for 45 minutes during which time about 2.2 mL of phenol was collected. The pressure was then lowered to 50 Torr and maintained for 30 minutes, collecting an additional 0.8 mL of phenol. The temperature was then raised to 220° C. and after 30 minutes the cumulative total of phenol was about 3.3 mL. For the next 30 minutes the reactor was held at 220° C. and 25 Torr, then 240° C. and 25 Torr for 30 minutes. Finally, the temperature held at 240° C. and full vacuum applied for 60 minutes, the final amount of phenol collected being about 4.1 mL (93% of theory). The viscous amber colored material was poured onto an aluminum pan, yielding 4.9 grams. GPC analysis indicated a Mw of 14,400.

Into a 5-neck Morton round bottomed flask equipped with a pH electrode, phosgene addition tube, condenser, caustic addition port, and a stirring shaft was charged polyester oligomers (4.75 g), bisphenol A (3.01 g, 0.0132 moles), methylene chloride (100 mL), deionized water (100 mL), and triethylamine (200 microliters). The pH of the reaction mixture was taken to 10 and phosgene added (3.0 g, 0.75 g/min). The pH was maintained at 10 for the entire phosgenation. The reaction mixture was separated, the organic phase washed with hydrochloric acid (1N), hydrochloric acid (0.1N) and twice with water, and the polymer was isolated by precipitation in hot water. The Mw of the isolated material was 35,861.

EXAMPLE 4

Into a glass reactor equipped with a stir shaft, Dean Stark trap with Vigreux column and vacuum attachment was charged resorcinol (3.66 g, 0.0332 moles), diphenylisophthalate (3.98 g, 0.0125 moles), diphenylterephthalate (3.98 g, 0.0125 moles), sodium hydroxide (2.65 microliters of 25 wt % solution), and tetrabutylphosphonium acetate (20 microliters of 40 wt % solution). A nitrogen atmosphere was established (3 vacuum purges) and slow stirring begun. The reactor was lowered into a salt bath controlled at about 200° C. After 15 minutes the pressure was reduced to 100 Torr. This pressure and temperature were maintained for 165 minutes during which time about 3.3 mL of phenol was collected. The pressure was then lowered to 75 Torr and maintained for 60 minutes, collecting an additional 0.2 mL of phenol. The temperature was then raised to 220° C. and after 60 minutes a cumulative total of about 3.7 mL of phenol had been obtained. For the next 60 minutes the reactor was held at 240° C. and 75 Torr, then 240° C. and 50 Torr for 60 minutes. Finally, the temperature held at 240° C. and full vacuum applied for 90 minutes, the final amount of phenol being about 4.3 mL (98% of theory). The viscous amber colored material was poured onto an aluminum pan, yielding 4.2 grams. An additional 1.6 g was chipped out of the reactor after cooling. GPC analysis indicated a Mw of 5,511.

Into a 5-neck Morton round bottomed flask equipped with a pH electrode, phosgene addition tube, condenser, caustic addition port, and a stirring shaft was charged polyester oligomers (5.7 g), bisphenol A (1.5 g, 0.006 moles), phenol (0.08 g, 0.00085 moles), methylene chloride (100 mL), deionized water (25 mL), and triethylamine (50 microliters). The pH of the reaction mixture was taken to 10 and phosgene added (1.2 g, 0.4 g/min). The pH was maintained at 10 for the entire phosgenation. The reaction mixture was separated, the organic phase washed with hydrochloric acid (1N), hydrochloric acid (0.1N) and twice with water, and the polymer was isolated by precipitation in hot water. The Mw of the isolated material was 32,158.

EXAMPLE 5

Into a glass reactor equipped with a stir shaft, Dean Stark trap with Vigreux column and vacuum attachment was charged resorcinol (3.03 g, 0.0275 moles), diphenylisophthalate (3.98 g, 0.0125 moles), diphenylterephthalate (3.98 g, 0.0125 moles), sodium hydroxide (2.65 microliters of 25 wt % solution), and tetrabutylphosphonium acetate (20 microliters of 40 wt % solution). A nitrogen atmosphere was established (3 vacuum purges) and slow stirring began. The reactor was lowered into a salt bath controlled at about 200° C. After 15 minutes the pressure was reduced to 100 Torr. This pressure and temperature were maintained for 165 minutes during which time about 2.6 mL of phenol was collected. The pressure was then lowered to 75 Torr and maintained for 60 minutes, collecting an additional 0.1 mL of phenol. The temperature was then raised to 220° C. and after 60 minutes a cumulative total of about 3.0 mL of phenol had been obtained. For the next 60 minutes the reactor was held at 240° C. and 75 Torr, then 240° C. and 50 Torr for 60 minutes. Finally, the temperature held at 240° C. and full vacuum applied for 40 minutes, the final amount of phenol being about 4.2 mL (95% of theory). The viscous amber colored material was poured onto an aluminum pan, yielding 3.84 grams. An additional 1.9 g was chipped out of the reactor after cooling. GPC analysis indicated a Mw of 11,080.

Into a 5-neck Morton round bottomed flask equipped with a pH electrode, phosgene addition tube, condenser, caustic addition port, and a stirring shaft was charged polyester oligomers (5.7 g), bisphenol A (1.5 g, 0.006 moles), phenol (0.056 g, 0.00059 moles), methylene chloride (100 mL), deionized water (25 mL), and triethylamine (50 microliters). The pH of the reaction mixture was taken to 10 and phosgene added (1.2 g, 0.4 g/min). The pH was maintained at 10 for the entire phosgenation. The reaction mixture was separated, the organic phase washed with hydrochloric acid (1N), hydrochloric acid (0.1N) and twice with water, and the polymer was isolated by precipitation in hot water. The Mw of the isolated material was 19,219.

EXAMPLE 6

Into a glass reactor equipped with a stir shaft, Dean Stark trap with Vigreux column and vacuum attachment was charged resorcinol (5.5 g, 0.05 moles), diphenylisophthalate (3.98 g, 0.0125 moles), diphenylterephthalate (3.98 g, 0.0125 moles), sodium hydroxide (2.65 microliters of 25 wt % solution), and tetrabutylphosphonium acetate (20 microliters of 40 wt % solution). A nitrogen atmosphere was established (3 vacuum purges) and slow stirring began. The reactor was lowered into a salt bath controlled at 200° C. After 15 minutes the pressure was reduced to 100 Torr. This pressure and temperature were maintained for 165 minutes during which time a cumulative total of about 3.6 mL of phenol was collected. The temperature was then raised to 220° C. and after 120 minutes a cumulative total of 3.9 mL of phenol had been obtained. Finally, the temperature held at 240° C. and the vacuum lowered to 50 Torr for 60 minutes, the final amount of phenol being about 4.1 mL (93% of theory). The fluid amber colored material was poured onto an aluminum pan, yielding 7.62 grams. GPC analysis indicated a Mw of 1,306.

Into a 5-neck Morton round bottomed flask equipped with a pH electrode, phosgene addition tube, condenser, caustic addition port, and a stirring shaft was charged polyester oligomers (7.0 g), bisphenol A (1.5 g, 0.006 moles), phenol (0.08 g, 0.00085 moles), methylene chloride (100 mL), deionized water (25 mL), and triethylamine (50 microliters). The pH of the reaction mixture was taken to 10 and phosgene added (2 g, 0.4 g/min). The pH was maintained at 10 for the entire phosgenation. The reaction mixture was separated, the organic phase washed with hydrochloric acid (1N), hydrochloric acid (0.1N) and twice with water, and the polymer was isolated by precipitation in hot water. The Mw of the isolated material was 52,325.

EXAMPLE 7

Into a glass reactor equipped with a stir shaft, Dean Stark trap with Vigreux column and vacuum attachment was charged resorcinol (3.66 g, 0.0332 moles), diphenylisophthalate (3.98 g, 0.0125 moles), diphenylterephthalate (3.98 g, 0.0125 moles), sodium hydroxide (2.65 microliters of 25 wt % solution), and tetrabutylphosphonium acetate (20 microliters of 40 wt % solution). A nitrogen atmosphere was established (3 vacuum purges) and slow stirring begun. The reactor was lowered into a salt bath controlled at about 200° C. After 15 minutes, the pressure was reduced to 100 Torr. This pressure and temperature were maintained for 165 minutes during which time about 3.1 mL of phenol was collected. The temperature was then raised to 240° C. and the pressure lowered to 75 Torr, and after 120 minutes a cumulative total of 3.9 mL of phenol had been obtained. The temperature was held at 240° C. and the vacuum lowered to 50 Torr for 60 minutes, and finally full vacuum for 30 minutes. The final amount of phenol being about 4.2 mL (95% of theory). The fluid amber colored material was poured onto an aluminum pan, yielding 4.98 grams. GPC analysis indicated a Mw of 5,209.

Into a 5-neck Morton round bottomed flask equipped with a pH electrode, phosgene addition tube, condenser, caustic addition port, and a stirring shaft was charged polyester oligomers (4.9 g), bisphenol A (1.17 g, 0.005 moles), methylene chloride (100 mL), deionized water (25 mL), and triethylamine (50 microliters). The pH of the reaction mixture was taken to 10 and phosgene added (1.2 g, 0.4 g/min). The pH was maintained at 10 for the entire phosgenation. The reaction mixture was separated, the organic phase washed with hydrochloric acid (1N), hydrochloric acid (0.1N) and twice with water, and the polymer was isolated by precipitation in hot water. The Mw of the isolated material was 50,637.

EXAMPLE 8

Into a glass reactor equipped with a stir shaft, Dean Stark trap with Vigreux column and vacuum attachment was charged resorcinol (3.03 g, 0.0275 moles), diphenylisophthalate (3.98 g, 0.0125 moles), diphenylterephthalate (3.98 g, 0.0125 moles), sodium hydroxide (2.65 microliters of 25 wt % solution), and tetrabutylphosphonium acetate (20 microliters of 40 wt % solution). A nitrogen atmosphere was established (3 vacuum purges) and slow stirring begun. The reactor was lowered into a salt bath controlled at about 200° C. After 25 minutes the pressure was reduced to 100 Torr. This pressure and temperature were maintained for 105 minutes during which time about 2.8 mL of phenol was collected. The pressure was lowered to 75 Torr and maintained at this temperature and pressure for 60 minutes. The temperature was then raised to 240° C. and after 120 minutes a cumulative total of 3.6 mL of phenol had been obtained. Finally, the pressure was lowered to 50 Torr for an hour and full vacuum for 60 minutes, the final amount of phenol collected being about 4.1 mL (93% of theory). The fluid amber colored material was poured onto an aluminum pan, yielding 5.22 grams. GPC analysis indicated a Mw of 7,541.

Into a 5-neck Morton round bottomed flask equipped with a pH electrode, phosgene addition tube, condenser, caustic addition port, and a stirring shaft was charged polyester oligomers (5.15 g), bisphenol A (1.4g, 0.006 moles), methylene chloride (100 mL), deionized water (25 mL), and triethylamine (50 microliters). The pH of the reaction mixture was taken to 10 and phosgene added (1.2 g, 0.4 g/min). The pH was maintained at 10 for the entire phosgenation. The reaction mixture was separated, the organic phase washed with hydrochloric acid (1N), hydrochloric acid (0.1N) and twice with water, and the polymer was isolated by precipitation in hot water. The Mw of the isolated material was 21,328.

CONTROL EXAMPLE 8

A polyester intermediate derived from resorcinol with a 1:1 mixture of iso- and terephthaloyl dichlorides was prepared in a blender according to the interfacial method of U.S. Pat. No. 3,460,961. The isolated polymer had weight average molecular weight of about 289,000. The procedure was repeated with methylene chloride as organic solvent with addition of 4 mole % chain-stopper (phenol), resulting in polymer with weight average molecular weight of about 51,000. The latter polyester intermediate was used to prepare a resorcinol arylate-containing block copolyestercarbonate with 50% by weight carbonate blocks through interfacial reaction with phosgene, bisphenol A, and p-cumyl phenol capping agent. Extrusion of the copolyestercarbonate gave amber pellets. The copolymer had initial Mw of 75,900 and Mw after extrusion of 64,500 (85% retention). A separate sample of material was treated with diisobutylamine in solution; the Mw of the recovered material was 73,000 (96% retention).

The molecular weight values for polyester oligomer and copolyestercarbonate product are summarized in Table 1, along with % excess resorcinol added and % phenol removed in polyester oligomer formation step (A), and % phenol added in copolyestercarbonate formation step (B).

TABLE 1

| example | Mw oligomer | % excess resorcinol | % phenol removed | mol % added phenol | total mol % phenol | Final polymer Mw | copolymer % Mw los* | % ester/carbonate |
|---|---|---|---|---|---|---|---|---|
| 1 | 8,175 | 10 | 80 | 0 | 20 | 13,202 | 0.2 | 100/0 |
| 2 | 9,891 | 10 | 86 | 0 | 8.3 | 24,513 | 0.3 | 60/40 |
| 3 | 14,400 | 10 | 93 | 0 | 4.2 | 35,861 | 1.4 | 60/40 |
| 4 | 5,511 | 32 | 98 | 2.8 | 4.7 | 32,158 | 0.9 | 80/20 |
| 5 | 11,080 | 10 | 95 | 2 | 5.7 | 19,219 | 1.9 | 80/20 |
| 6 | 1,306 | 100 | 93 | 3.4 | 7 | 52,325 | 0.5 | 83/17 |
| 7 | 5,209 | 32 | 95 | 0 | 3.6 | 50,637 | 1.6 | 80/20 |
| 8 | 7,541 | 10 | 93 | 0 | 5.3 | 21,328 | 0.3 | 80/20 |

*by diisobutylamine test

The copolyestercarbonates of Table 1 showed essentially no molecular weight loss in the diisobutylamine test, indicating that no anhydride was present. The diisobutylamine test was also run on selected polyester oligomer samples; essentially no molecular weight loss was observed.

EXAMPLE 9

To a 100 mL 3-neck flask equipped with a mechanical stirrer, nitrogen inlet and reflux condenser with Dean-Stark apparatus were added bis(o-chlorophenyl)-isophthalate (30.97 g, 80 mmol), bis(o-chlorophenyl)sebacate (8.46 g, 20 mmol), freshly distilled resorcinol (11.01 g, 100 mmol) and tetramethylammonium tetraphenylborate (50.4 mg, 100 ppm wt). The flask was blanketed with dry nitrogen and the contents maintained at 250° C. for one hour, during which time vigorous distillation of chlorophenol occurred. The temperature was then gradually raised to 280° C. over a period of three hours while passing a slow stream of nitrogen through. The molten polymer was quickly poured onto a TEFLON coated metal sheet to give a translucent light amber colored material. GPC analysis indicated a Mw of 4,000. The polyester oligomer was suitable for use in preparation of copolyestercarbonates.

EXAMPLE 10

To a melt polycondensation reactor equipped with mechanical stirrer, nitrogen inlet and reflux condenser with Dean-Stark apparatus were added bis(methylsalicyl) isophthalate (8.688 g, 20 mmol), resorcinol (2.202 g, 20 mmol) and lithium hydroxide (1.4 mg, 128 ppm wt.). The mixture was heated under argon at 220° C. Within 5 minutes a white suspension formed. After 30 minutes, 4.2 ml of methyl salicylate (81% conversion) distilled under application of slight vacuum. High vacuum was applied at one hour reaction time. No oligomer sublimation was noticed. The mixture was reacted at 250° C. for one more hour, then cooled to 150° C. under argon and quickly stranded out of the reactor at this temperature to give a transparent, almost colorless polymer. GPC analysis indicated a Mw of 15,000. The polyester oligomer was suitable for use in preparation of copolyestercarbonates.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents cited herein are incorporated herein by reference.

What is claimed is:

1. A method for preparing a block copolyestercarbonate substantially free of anhydride linkages linking at least two mers of the polymer chain, which comprises the steps of:
   (A) preparing a hydroxy-terminated polyester intermediate in a molten reaction mixture comprising at least one 1,3-dihydroxybenzene moiety and at least one aromatic dicarboxylic acid diarylester under transesterification conditions, said polyester intermediate having a degree of polymerization of at least 4; and
   (B) conducting a reaction of said polyester intermediate with a carbonate precursor in a two-phase system comprising an aqueous phase and a water-immiscible organic solvent.

2. The method of claim 1 wherein at least one 1,3-dihydroxybenzene moiety is selected from the group consisting of unsubstituted resorcinol, 2-methyl resorcinol, and mixtures thereof.

3. The method of claim 2 wherein at least one 1,3-dihydroxybenzene moiety is unsubstituted resorcinol.

4. The method of claim 1 wherein at least one aromatic dicarboxylic acid (diaryl ester is derived from a dicarboxylic acid selected from the group consisting of isophthalic acid, terephthalic acid, and naphthalene-2,6-dicarboxylic acid, and mixtures thereof.

5. The method of claim 4 wherein the aromatic dicarboxylic acid diaryl ester comprises a mixture isophthalic acid diaryl ester and terephthalic acid diaryl ester.

6. The method of claim 5 wherein the ratio of isophthalic acid diaryl ester to terephthalic acid diaryl ester is about 0.2–5:1.

7. The method of claim 6 wherein the ratio of isophthalic acid diaryl ester to terephthalic acid diaryl ester is about 0.8–2.5:1.

8. The method of claim 7 wherein the ratio of isophthalic acid diaryl ester to terephthalic acid diaryl ester is about 1.01–1.5:1.

9. The method of claim 8 wherein the ratio of isophthalic acid diaryl ester to terephthalic acid diaryl ester is about 1.02–1.2:1.

10. The method of claim 4 wherein at least one aromatic dicarboxylic acid diaryl ester is derived from a monohydroxy aromatic compound selected from the group consisting of an unsubstituted monohydroxy aromatic compound and monohydroxy aromatic compounds comprising at least one electron withdrawing group ortho or para to the oxygen substituent of the monohydroxy moiety.

11. The method of claim 10 wherein at least one aromatic dicarboxylic acid diaryl ester is derived from a monohydroxy aromatic compound selected from the group consisting of phenol, o-carbomethoxyphenol, o-carbomethoxymethylphenol, o-carboethoxyphenol, o-carbopropoxyphenol, o-chlorophenol, o-carbophenylphenol, o-carbophenoxyphenol, o-carbobenzoxyphenol, and o-nitrophenol.

12. The method of claim 10 wherein monohydroxy aromatic compound is recovered from the reaction mixture.

13. The method of claim 4 further comprising at least one aliphatic dicarboxylic acid diaryl ester.

14. The method of claim 13 wherein an aliphatic dicarboxylic acid diaryl ester comprises at least one dicarboxylic acid selected from the group consisting of a $C_{3-20}$ straight chain alkylene dicarboxylic acid, a $C_{3-20}$ branched alkylene dicarboxylic acid, $C_{4-20}$ cycloalkylene dicarboxylic acid, and a $C_{4-20}$ bicycloalkylene dicarboxylic acid.

15. The method of claim 14 wherein an aliphatic dicarboxylic acid diaryl ester comprises at least one alkylene dicarboxylic acid selected from the group consisting of sebacic acid, cyclohexane-1,4-dicarboxylic acid, and mixtures thereof.

16. The method of claim 13 wherein at least one alkylene dicarboxylic acid diaryl ester is derived from a monohydroxy aromatic compound selected from the group consisting of an unsubstituted monohydroxy aromatic compound and monohydroxy aromatic compounds comprising at least one electron withdrawing group ortho or para to the oxygen substituent of the monohydroxy moiety.

17. The method of claim 16 wherein at least one alkylene dicarboxylic acid diaryl ester is derived from a monohydroxy aromatic compound selected from the group consisting of phenol, o-carbomethoxyphenol, o-carbomethoxymethylphenol, o-carboethoxyphenol, o-carbopropoxyphenol, o-chlorophenol, o-carbophenylphenol, o-carbophenoxyphenol, o-carbobenzoxyphenol, and o-nitrophenol.

18. The method of claim 16 wherein monohydroxy aromatic compound is recovered from the reaction mixture.

19. The method of claim 1 wherein the molar ratio of 1,3-dihydroxybenzene moiety to dicarboxylic acid diester in step (A) is in the range of about 1.01–1.90:1.

20. The method of claim 19 wherein the molar ratio of 1,3-dihydroxybenzene moiety to dicarboxylic acid diester in step (A) is in the range of about 1.01–1.25:1.

21. The method of claim 1 wherein step (A) further comprises a catalyst.

22. The method of claim 21 wherein a catalyst is present at a total level of about $10^{-8}$ moles to about 0.1 moles per mole of dicarboxylic acid diester compound.

23. The method of claim 21 wherein the catalyst comprises at least one member selected from the group consisting of nitrogen-containing basic compounds, phosphorus-containing basic compounds, alkali metal compounds, alkaline earth metal compounds, a boric acid and a boric ester.

24. The method of claim 21 wherein the catalyst comprises at least two members selected from the group consisting of nitrogen-containing basic compounds, phosphorus-containing basic compounds, alkali metal compounds, alkaline earth metal compounds, a boric acid and a boric ester.

25. The method of claim 1 wherein the polyester intermediate is recovered from the reaction mixture of step (A).

26. The method of claim 1 wherein the polyester intermediate comprises phenolic hydroxy end-groups at a level in a range of between about 500 ppm and about 20,000 ppm.

27. The method of claim 26 wherein the polyester intermediate comprises phenolic hydroxy end-groups at a level in a range of between about 1500 ppm and about 9700 ppm.

28. The method of claim 1 wherein the polyester intermediate has a weight average molecular weight of at least about 900.

29. The method of claim 28 wherein the polyester intermediate has a weight average molecular weight in a range of between about 900 and about 20,000.

30. The method of claim 1 wherein the polyester intermediate shows decrease in molecular weight of less than about 20% upon heating said polyester at a temperature of about 280–290° C. for five minutes.

31. The method of claim 30 wherein the polyester intermediate shows decrease in molecular weight of less than about 10% upon heating said polyester at a temperature of about 280–290° C. for five minutes.

32. The method of claim 1 wherein the carbonate precursor is phosgene and the two-phase system further comprises an acid acceptor.

33. The method of claim 32 wherein the two-phase system further comprises at least one catalyst.

34. The method of claim 32 wherein the pH in step (B) is maintained in the range of about 4–9 for the initial part and increased to about 10–13 during the latter part of said reaction.

35. The method of claim 32 wherein the reaction in step (B) is conducted in the presence of at least one organic dihydroxy compound different from the hydroxy-terminated polyester intermediate.

36. The method of claim 35 wherein at least one organic dihydroxy compound is the same as at least one 1,3-dihydroxybenzene moiety in step (A).

37. The method of claim 36 wherein at least one organic dihydroxy compound is unsubstituted resorcinol.

38. The method of claim 35 wherein at least one organic dihydroxy compound is different from any 1,3-dihydroxybenzene moiety in step (A).

39. The method of claim 38 wherein at least one organic dihydroxy compound is bisphenol A.

40. The method of claim 35 wherein at least one polycarbonate homopolymer is prepared in the presence of or simultaneously with the copolyestercarbonate.

41. The method of claim 40 wherein at least one organic dihydroxy compound is bisphenol A.

42. The method of claim 35 wherein the reaction in step (B) is conducted in the presence of a mixture of organic dihydroxy compounds, at least one of which is the same as and at least one of which is different from any 1,3-dihydroxybenzene moiety in step (A).

43. The method of claim 42 wherein the mixture of organic dihydroxy compounds consists of unsubstituted resorcinol and bisphenol A.

44. The method of claim 1 wherein step (B) is conducted in the presence of at least one mono-phenolic compound as chain-stopper.

45. The method of claim 1 wherein the copolyestercarbonate is recovered from the reaction mixture.

46. The method of claim 1 wherein the copolyestercarbonate shows decrease in molecular weight of less than about 20% upon heating said copolyestercarbonate at a temperature of about 280–290° C. for five minutes.

47. The method of claim 46 wherein the copolyestercarbonate shows decrease in molecular weight of less than about 10% upon heating said copolyestercarbonate at a temperature of about 280–290° C. for five minutes.

48. The method of claim 1 wherein the copolyestercarbonate has polyester blocks with degree of polymerization of at least about 10.

49. The method of claim 1 wherein the copolyestercarbonate has polyester blocks with degree of polymerization of at least about 20.

50. The method of claim 1 wherein the copolyestercarbonate has polyester blocks with degree of polymerization in a range of between about 30 and about 150.

51. The method of claim 1 wherein the copolyestercarbonate has polycarbonate blocks with degree of polymerization of at least about 1.

52. The method of claim 1 wherein the copolyestercarbonate has polycarbonate blocks with degree of polymerization of at least about 3.

53. The method of claim 1 wherein the copolyestercarbonate has polycarbonate blocks with degree of polymerization of at least about 10.

54. The method of claim 1 wherein the copolyestercarbonate has polycarbonate blocks with degree of polymerization in a range of between about 20 and about 200.

55. A method for preparing a block copolyestercarbonate substantially free of anhydride linkages linking at least two mers of the polymer chain, which comprises the steps of:

(A) preparing a hydroxy-terminated polyester intermediate in a molten reaction mixture comprising at least one 1,3-dihydroxybenzene moiety and at least one aromatic dicarboxylic acid diarylester under transesterification conditions, said polyester intermediate having a degree of polymerization in a range of between about 4 and about 150; recovering the copolyestercarbonate from the reaction mixture; and (B) conducting a reaction of said polyester intermediate with phosgene in a two-phase system comprising an aqueous phase, a water-immiscible organic solvent, an acid acceptor, and at least one catalyst; and isolating the copolyestercarbonate, said copolyestercarbonate showing decrease in molecular weight of less than about 10% upon heating said copolyestercarbonate at a temperature of about 280–290° C. for five minutes.

56. The method of claim 55 wherein step (B) is conducted in the presence of at least one mono-phenolic compound as chain-stopper.

57. A method for preparing a block copolyestercarbonate substantially free of anhydride linkages linking at least two mers of the polymer chain, which comprises the steps of:

(A) preparing a hydroxy-terminated polyester intermediate in a molten reaction mixture comprising at least one 1,3-dihydroxybenzene moiety and at least one aromatic dicarboxylic acid diarylester under transesterification conditions, said polyester intermediate having a degree of polymerization in a range of between about 4 and about 150; recovering the copolyestercarbonate from the reaction mixture; and (B) conducting a reaction of said polyester intermediate with a carbonate precursor in the presence of at least one organic dihydroxy compound different from the hydroxy-terminated polyester intermediate in a two-phase system comprising an aqueous phase, a water-immiscible organic solvent, an acid acceptor, and at least one catalyst; and isolating the copolyestercarbonate, said copolyestercarbonate having a degree of polymerization in the carbonate blocks in a range of between about 1 and about 200; and showing decrease in molecular weight of less than about 10% upon heating said copolyestercarbonate at a temperature of about 280–290° C. for five minutes.

58. The method of claim 57 wherein at least one organic dihydroxy compound is bisphenol A.

59. The method of claim 57 wherein at least one organic dihydroxy compound is unsubstituted resorcinol.

60. The method of claim 57 wherein step (B) is conducted in the presence of at least one mono-phenolic compound as chain-stopper.

61. The method of claim 57 wherein at least one polycarbonate homopolymer is prepared in the presence of or simultaneously with the copolyestercarbonate.

62. A multilayer article comprising:

a substrate layer comprising at least one thermoplastic polymer, thermoset polymer, cellulosic material, glass, or metal, and at least one coating layer thereon, said coating layer comprising the copolyestercarbonate of claim 1.

63. The article of claim 62 wherein the substrate comprises at least one homo- or copolymeric aliphatic olefin or functionalized olefin polymer, polycarbonate, polyester or addition polymer of an alkenylaromatic compound.

64. The article of claim 63 wherein the substrate comprises at least one polyethylene, polypropylene, bisphenol A homo- or copolycarbonate, poly(alkylene terephthalate), or ABS or ASA copolymer.

65. The article of claim 62 wherein the coating layer further comprises at least one colorant.

66. The article of claim 62 wherein the coating layer further comprises at least one stabilizer additive selected from the group consisting of phosphorous acid, a UV absorber, a hindered phenol, and a phosphite.

67. The article of claim 62 wherein the substrate contains at least one of fillers and colorants.

68. The article of claim 62 further comprising an intermediate layer disposed between said coating and substrate layers.

69. The article of claim 68 wherein the intermediate layer contains at least one of fillers and colorants.

70. The article of claim 62 which is an aircraft, automotive, truck, military vehicle, military aircraft, military water-borne vehicle, scooter, or motorcycle exterior or interior component, panel, quarter panel, rocker panel, trim, fender, door, decklid, trunklid, hood, bonnet, roof, bumper, fascia, grill, mirror housing, pillar applique, cladding, body side molding, wheel cover, hubcap, door handle, spoiler, window frame, headlamp bezel, headlamp, tail lamp, tail lamp housing, tail lamp bezel, license plate enclosure, roof rack, or running board;

an enclosure, housing, panel, part, or trim for an outdoor vehicle or device, an electrical or telecommunication device, network interface device, outdoor furniture, aircraft, boat or marine equipment, outboard motor, depth finder, personal water-craft, jet-ski, pool, spa, hot-tub, step, step covering, automatic teller machine (ATM), lawn or garden tractor, lawn mower, tool, sporting equipment, toy, snowmobile, recreational vehicle, golf course marker, or playground equipment;

an enclosure, housing, panel, part, or trim for a computer, desk-top computer, portable computer, lap-top computer, palm-held computer, monitor, printer, keyboard, FAX machine, copier, telephone, mobile phone, phone bezel, radio sender, radio receiver, meter, antenna, light fixture, lighting appliance, transformer, or air conditioner;

an article used in building or construction, glazing, roofing, window, window trim, floor, wall panel, door, door trim, countertop, decorative window furnishing or treatment; a treated glass cover for a picture, painting, poster, or display item; a protected graphic; an outdoor or indoor sign; optical lens; ophthalmic lens; corrective ophthalmic lens; implantable ophthalmic lens; an article made from a plastic-wood combination; a utility pit cover; shoe lace; cladding or seating for public transportation; cladding or seating for trains, subways, or buses; cladding for satellite dishes; coated helmet or personal protective equipment; coated synthetic or natural textiles; coated photographic film or photographic print; coated painted article; coated dyed article; coated fluorescent article; or coated foam article.

71. A method for preparing a multilayer article which comprises applying at least one thermally stable coating layer to a second layer, said second layer comprising at least one thermoplastic polymer, thermoset polymer, cellulosic material, glass, or metal, and said coating layer comprising the copolyestercarbonate of claim 1.

72. The method of claim 71 wherein the substrate comprises at least one homo- or copolymeric aliphatic olefin or functionalized olefin polymer, polycarbonate, polyester or addition polymer of an alkenylaromatic compound.

73. The method of claim 72 wherein the substrate comprises at least one polyethylene, polypropylene, bisphenol A homo- or copolycarbonate, poly(alkylene terephthalate), or ABS or ASA copolymer.

74. The method of claim 71 wherein the coating layer further comprises at least one colorant.

75. The method of claim 71 wherein the coating layer further comprises at least one stabilizer additive selected from the group consisting of phosphorous acid, a UV absorber, a hindered phenol, and a phosphite.

76. The method of claim 71 wherein the substrate contains at least one of fillers and colorants.

77. The method of claim 71 further comprising an intermediate layer disposed between said coating and substrate layers.

78. The method of claim 77 wherein the intermediate layer contains at least one of fillers and colorants.

79. The method of claim 71 wherein said multilayer article is further applied to a substrate layer.

80. The method of claim 79 wherein the substrate layer comprises at least one homo- or copolymeric aliphatic olefin or functionalized olefin polymer, polycarbonate, polyester or additional polymer of an alkenylaromatic compound.

* * * * *